US008444068B2

(12) United States Patent
Hahn et al.

(10) Patent No.: US 8,444,068 B2
(45) Date of Patent: May 21, 2013

(54) DUAL FLOW PRESSURE WASHER

(75) Inventors: Klaus Karl Hahn, Braselton, GA (US); Michael R. Gardner, Anderson, SC (US); Charles Keith Long, Seneca, SC (US); Jesse John Jerabek, Anderson, SC (US)

(73) Assignee: Techtronic Outdoor Products Technology Limited, Hamilton (BM)

( * ) Notice: Subject to any disclaimer, the term of this patent is extended or adjusted under 35 U.S.C. 154(b) by 376 days.

(21) Appl. No.: 12/109,947

(22) Filed: Apr. 25, 2008

(65) Prior Publication Data

US 2008/0257988 A1 Oct. 23, 2008

Related U.S. Application Data

(63) Continuation-in-part of application No. 11/585,503, filed on Oct. 24, 2006.

(60) Provisional application No. 60/730,465, filed on Oct. 26, 2005, provisional application No. 60/830,071, filed on Jul. 11, 2006, provisional application No. 61/047,675, filed on Apr. 24, 2008, provisional application No. 61/047,912, filed on Apr. 25, 2008.

(51) Int. Cl.
*B05B 15/00* (2006.01)
*A62C 2/08* (2006.01)
*F16L 9/18* (2006.01)
*F16L 9/14* (2006.01)

(52) U.S. Cl.
USPC ........... 239/450; 239/548; 138/115; 138/117; 138/128; 138/137; 138/155

(58) Field of Classification Search
USPC .................... 239/265.25, 312, 349, 407, 408, 239/418, 436, 443, 444, 446, 447, 450, 525, 239/526, 548, 550, 551, 562, 565; 138/111, 138/115, 116, 117, 120, 128, 137, 140, 155
See application file for complete search history.

(56) References Cited

U.S. PATENT DOCUMENTS 2,624,366 A * 1/1953 Pugh .............................. 138/115
3,904,116 A 9/1975 Jones et al.
4,086,937 A * 5/1978 Hechler, IV .................. 137/559

(Continued)

FOREIGN PATENT DOCUMENTS

DE 41 15 395 C2 2/1993
DE 9412004 7/1994

(Continued)

OTHER PUBLICATIONS

U.S. Appl. No. 29/280,490, filed May 30, 2007, Hahn et al.

(Continued)

*Primary Examiner* — Ryan Reis
(74) *Attorney, Agent, or Firm* — Michael Best & Friedrich LLP

(57) ABSTRACT

A pressure washer is provided. The pressure washer includes a fluid inlet and a pump disposed to receive fluid from the fluid inlet. A spray gun is provided that includes a first outlet and a separate second outlet. A first conduit fluidly connects the fluid inlet and the pump with the first outlet and a second conduit fluidly connects the fluid inlet with the second outlet.

25 Claims, 20 Drawing Sheets

U.S. PATENT DOCUMENTS

| | | | | |
|---|---|---|---|---|
| 4,197,872 | A | 4/1980 | Parker | |
| 4,341,350 | A | 7/1982 | Wemmer | |
| D270,368 | S | 8/1983 | Grime | |
| 4,621,770 | A * | 11/1986 | Sayen | 239/304 |
| D292,133 | S | 9/1987 | Proctor et al. | |
| 4,792,096 | A | 12/1988 | Gregory | |
| 4,824,340 | A | 4/1989 | Bruggeman et al. | |
| 4,926,904 | A | 5/1990 | Polk et al. | |
| 5,004,160 | A | 4/1991 | Berfield | |
| 5,040,950 | A | 8/1991 | Dalquist, III | |
| 5,067,654 | A | 11/1991 | Paige | |
| 5,071,069 | A | 12/1991 | Stirm | |
| 5,148,992 | A | 9/1992 | Morrow | |
| 5,169,068 | A | 12/1992 | Bertolini | |
| D334,972 | S | 4/1993 | Berfield et al. | |
| 5,221,193 | A | 6/1993 | Stougaard | |
| 5,230,368 | A | 7/1993 | Berfield | |
| 5,230,471 | A | 7/1993 | Berfield | |
| D347,261 | S | 5/1994 | Berfield et al. | |
| 5,338,162 | A | 8/1994 | Krarup | |
| 5,395,052 | A | 3/1995 | Schneider et al. | |
| 5,421,520 | A | 6/1995 | Simonette et al. | |
| D381,481 | S | 7/1997 | Medema et al. | |
| 5,669,558 | A | 9/1997 | Ichel | |
| 5,671,887 | A | 9/1997 | Iavarone | |
| 5,709,317 | A | 1/1998 | Bertram et al. | |
| 5,735,461 | A * | 4/1998 | Winther | 239/124 |
| 5,816,499 | A | 10/1998 | Christiansen | |
| 5,865,549 | A * | 2/1999 | Kinard et al. | 401/48 |
| 6,062,486 | A | 5/2000 | Hill | |
| 6,378,789 | B1 * | 4/2002 | Seaman et al. | 239/443 |
| 6,435,424 | B1 | 8/2002 | Pauley et al. | |
| 6,508,386 | B2 | 1/2003 | Magri | |
| 6,905,080 | B2 | 6/2005 | Pohorecki | |
| 6,929,198 | B2 | 8/2005 | Dexter | |
| D519,693 | S | 4/2006 | Ricker et al. | |
| 7,051,955 | B2 * | 5/2006 | Horner et al. | 239/417.3 |
| 7,059,305 | B2 | 6/2006 | Knaggs et al. | |
| D524,999 | S | 7/2006 | Ray | |
| 7,178,740 | B2 * | 2/2007 | Williams | 239/10 |
| D542,373 | S | 5/2007 | Cooper | |
| D560,046 | S | 1/2008 | Renner | |
| D563,503 | S | 3/2008 | Monk | |
| D567,458 | S | 4/2008 | Jiang et al. | |
| D571,434 | S | 6/2008 | Renner | |
| 7,568,636 | B2 * | 8/2009 | Saunders et al. | 239/310 |
| 7,661,609 | B2 * | 2/2010 | Dexter et al. | 239/527 |
| 2005/0205688 | A1 | 9/2005 | Bennett et al. | |
| 2007/0060952 | A1 | 3/2007 | Roby et al. | |

FOREIGN PATENT DOCUMENTS

| | | | |
|---|---|---|---|
| EP | 0 312 862 | | 4/1989 |
| EP | 0 420 473 | B1 | 4/1991 |
| EP | 0 468 082 | A1 | 1/1992 |
| EP | 0 464 229 | B1 | 2/1993 |
| EP | 0 606 302 | B1 | 9/1995 |
| EP | 0 620 766 | B1 | 11/1995 |
| EP | 0521 520 | B1 | 3/1996 |
| GB | 0 407 848 | | 5/2005 |

OTHER PUBLICATIONS

Photo of MAC hand held pressure washer, date unknown.

Materials of KEW Hobby 70 hand held pressure washer, dated Jan. 1992.

European Search Report, Application No. 09251152.6, dated Jan. 20, 2011, (6 pages).

* cited by examiner

DUAL FLOW PRESSURE WASHER

CROSS REFERENCE TO RELATED APPLICATIONS

This application is a continuation-in-part of U.S. nonprovisional application Ser. No. 11/585,503, titled “Hand Held Pressure Washer,” filed on Oct. 24, 2006, which claims priority from provisional application Ser. No. 60/730,465, filed on Oct. 26, 2005, and from provisional application Ser. No. 60/830,071, filed on Jul. 11, 2006, each of which are fully incorporated by reference herein. This application additionally claims priority from U.S. Provisional Application No. 61/047,675, filed on Apr. 24, 2008, titled “Nozzle With V-Shaped Flow Pattern,” and U.S. Provisional Application No. 61/047,912, filed on Apr. 25, 2008, titled “Nozzle With V-Shaped Flow Pattern,” the entirety of which are each fully incorporated by reference herein.

BACKGROUND

The present invention relates to a hand held pressure washer having improved portability. The hand held washer of the present invention provides a motor and pump in close proximity to the handle and lance.

Pressure washers typically have a wand with a handle in the form of a pistol grip. The handle usually has an inlet connector to receive a high pressure connection from which fluid is delivered from a remote motor and pump. A disadvantage is that the motor and pump are usually heavy and not very portable. Thus, the wand is oftentimes connected to the motor and pump by a substantial distance, resulting in a pressure loss at the nozzle head. Therefore, efforts have been made to make the motor and pump more portable so that the unit as a whole is more portable and thus reduce the distance the wand is from the motor and pump.

Additionally, typical pressure washers operate at relatively high pressures through operation of positive displacement pumps or other types of high pressure pumps known in the art. Due to design limitations of typical positive displacement pumps and other typical high pressure pumps, the flow rate through the pump, and accordingly through the entire pressure washer is limited. While the pressure washer gives off high pressure fluid, the flow through the pressure washer is limited, this makes flushing dirt that is dislodged away from the working surface a difficult and time consuming task.

SUMMARY

A first aspect of the present invention provides a pressure washer that includes a fluid inlet, a first outlet and a second outlet. A housing defining a fluid passageway is provided between (a) the fluid inlet and the first outlet and (b) the fluid inlet and the second outlet. A fluid pump and motor are disposed within the housing. The fluid passageway comprises a first branch and a second branch. The first branch allows fluid flow from the fluid inlet through the fluid pump and out the first outlet. The second branch allows fluid flow from the fluid inlet and out the second outlet while bypassing the fluid pump.

Another aspect of the present inventor provides a pressure washer is provided that includes a fluid inlet, a pump, a spray gun including a first nozzle and a separate second aperture. A first conduit fluidly connects the fluid inlet and the pump with the first nozzle and a second conduit fluidly connects the fluid inlet with the second aperture.

The present invention therefore provides a portable pressure washer that includes a housing having a front end and a rear end defining a longitudinal axis. A fluid pump and a motor are disposed within the housing. The fluid pump has an inlet fluid connection that extends from the rear end of the housing and a fluid outlet that is disposed generally orthogonal to the inlet connection. A handle having a first end extends from a rear portion of the housing and has a second end terminating in a barrel. The handle and barrel define a fluid passageway so that fluid from the outlet of the motor flows through the handle and barrel and desirably through a wand or lance to be emitted from the end of the lance, which may contain a spray nozzle.

Another aspect of the present invention provides a pressure washer that includes a housing having a front end and a rear end defining a longitudinal axis, a handle having a first end extending from a rear portion of the housing and a second end terminating in a barrel, a first nozzle and a second aperture extending from the barrel. A fluid pump and a motor are disposed within the housing and a fluid inlet is in fluid communication with the first nozzle and the second aperture. A relatively high pressure fluid may flow through the first nozzle and a relatively low pressure fluid may flow through the second aperture during pressure washer operation.

As a result of the compact configuration and size of the pump and motor, the pressure washer of the present invention can be easily and simply moved to a desired location by the user.

The present invention also includes a portable pressure washer that includes a housing having a front end and a rear end defining a longitudinal axis. A handle is provided with a first end extending from a rear portion of the housing and a second end terminating in a barrel. A first nozzle and a second aperture extend from the barrel. A fluid pump and a motor are disposed within the housing, which includes a fluid inlet in fluid communication with the first nozzle and the second aperture.

DESCRIPTION OF THE DRAWINGS

FIG. 10 is a side view of the pressure washer of FIG. 6 with the housing, handle, and barrel removed.

DESCRIPTION

Figure 1:
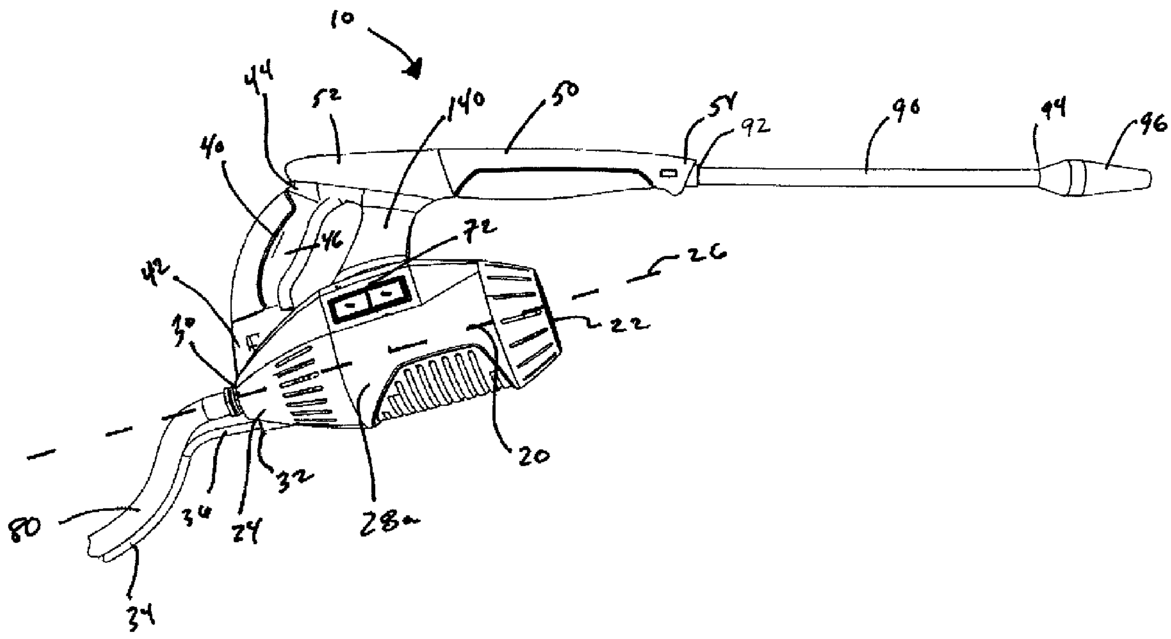
FIG. 1 is a side view of one embodiment of the hand held pressure washer of the present disclosure.
Figure 2:
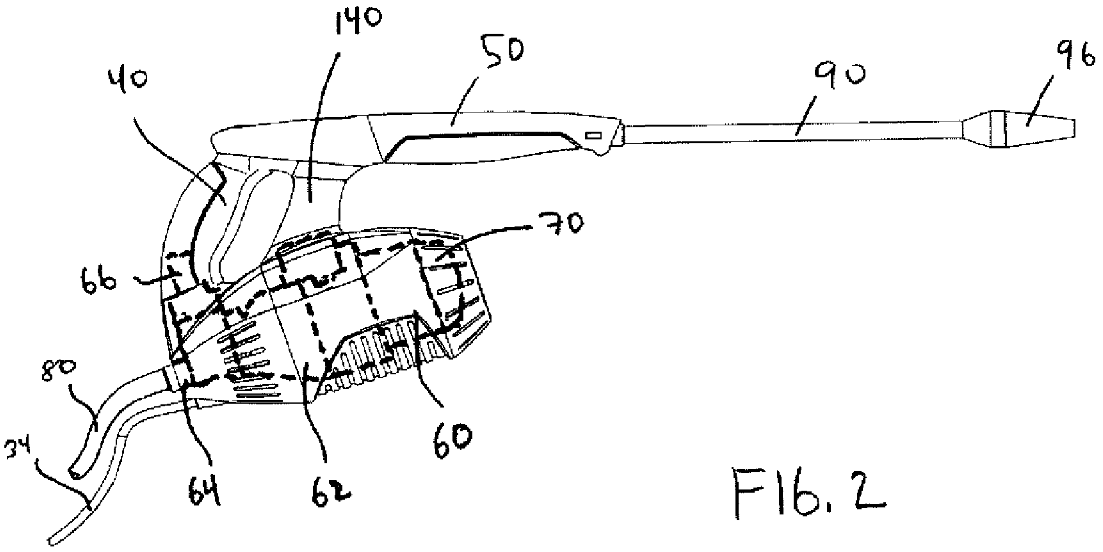
FIG. 2 is a side view of the pressure washer of FIG. 1, with a portion of the housing being transparent to show the location of the motor.

Referring now to the embodiment shown in FIG. 1, a pressure washer 10 according to the present invention is shown. The pressure washer 10 includes a housing 20 that substantially shrouds a pump mechanism 60. The housing 20 has a front end 22 and a rear end 24 that defines a longitudinal axis 26. The housing 20 generally includes a pair of mating housing shells 28*a*, 28*b* that cooperate to define a housing cavity (not shown) into which the pump mechanism 60 is mounted. The housing shells 28*a*, 28*b* also cooperate to form an inlet aperture 30, an electrical cord aperture 32, and a handle 40 that permits a user to hand-carry the pressure washer 10.

The handle 40 has a first end 42 that extends from a portion near the rear end 24 of the housing and a second end 44 that terminates in a barrel 50. The handle 40 and barrel 50 provide a fluid passageway from the outlet 66 of the pump 62. The fluid pressure at the outlet of the barrel 54 is greater than the fluid pressure at the inlet of the housing 30. By locating the handle 40 and the barrel 50 above the housing 20 containing the pump mechanism 60, the user can grasp the pressure washer 10 in at least two different locations, the handle 40 and the barrel 50. In addition, the location of the handle 40 and barrel 50 with respect to the housing 20 containing the pump mechanism 60 provides a pressure washer that is better balanced and easier to hold and maneuver as compared to a pressure washer in which the handle is located below pump and/or motor.

The pump mechanism 60 includes a fluid pump 62, with an inlet connection 64 and an outlet 66, and a motor 70 for operating the fluid pump 62. The motor 70 may be of any suitable type such as a universal or induction motor. The motor 70 may be powered in any suitable manner such as by gasoline or other combustible fuel or electrically such as by an AC or DC power source. The motor 70 may be connected to the pump in any known manner and may include a gear reduction, belt drive, or direct drive connections to the pump. Desirably, the motor 70 is electric.

A power switch 72 may be provided to actuate the motor. As shown in FIG. 1, the power switch 72 may be provided on a side of the housing 20. As shown, the power switch 72 includes two depressible buttons, one designated the “ON” button 74 for activating the motor and the other designated the “OFF” button 76 for deenergizing the motor. Desirably, when the OFF button 76 is pushed the ON button 74 is recessed from the outer most surface of the housing 20. When the ON button 74 is pushed, the OFF button 76 will stick out proud of the outer most surface of the housing 20 to assist in locating the OFF portion 76 of the power switch 72. Of course, it is to be understood that the switch could be a toggle switch, a button, pogo-pin, tactile, slider, dial, or the like. In other embodiments, the motor 60 may be operated through a motor controller mechanism 120, discussed below.

Those skilled in the art will appreciate that the description of motor 60 contained herein is exemplary only and not intended to limit the scope of the disclosure in any manner. Accordingly, those skilled in the art will understand that the fluid pump 62 may be operated by devices other than an electric motor, such as an internal combustion engine, and that the fluid pump 62 need not be operated through rotary motion.

Aside from the arrangement and configuration of the inlet connection 64 and the outlet 66, the pump mechanism 60 is conventional and as such, a detailed discussion of its configuration and operation is not needed as pump mechanisms of this general type are well known in the art. Briefly, the inlet connection 64 is configured to be coupled to a source of fluid, such as a garden hose delivering water, to thereby couple in fluid connection the fluid pump 62 and the source of fluid. Typically, the fluid is water, but it is to be understood that the pressure washer 10 of the present invention can be used with other fluids. Operation of the motor 70 serves to move pistons (not shown) in the fluid pump 62 to increase the pressure of the fluid in the fluid pump 62. The pressurized fluid leaves the fluid pump via the outlet 66, which is substantially orthogonal to the axis of the inlet connection. As will be evident from the description contained in the specification, the location of the outlet 66 advantageously allows the handle 40 to be configured in a manner to provide a fluid passage from the pump outlet 66 while still providing a compact design so that the user can easily manipulate the pressure washer 10. In other embodiments, other types of pump mechanisms 60 may be used, such as a diaphragm pump.

In one embodiment, the pump 62 is a 120 V AC unit that is capable of providing a fluid flow between about 0.5 to about 5 gallons per minute (gpm), desirably between about 0.75 and about 2.5 gpm, and more desirably between about 1.0 to about 1.6 gpm. The pump 62 may also provide an outlet pressure at the exit of the pump head in the range between about 300 psi to about 2000 psi, desirably between about 700 psi to about 1600 psi, and more desirably between about 900 psi to about 1500 psi.

Because the pump mechanism 60 of the illustrated embodiment includes an electric motor 70, the electric cord 34 of the electric motor 70 is desirably configured and arranged to extend in a rearward direction, such as from the rear end 24 of the housing 20 through the electrical cord aperture 32. Preferably, the electric cord 34 is positioned to extend in a direction parallel to the inlet connection 64. The electric cord 34 may include an integral strain relief structure 36 that is configured to engage the housing shells 28*a*, 28*b* in a conventional and well known manner to inhibit both rotation and axial sliding movement of the strain relief structure 36 relative to the housing 20.

Straps or clips (not shown) may be provided with the pressure washer 10 or may be attached to a portion of the electric cord 34. The strap can be used to connect the end of the fluid supply line with the electric cord 34 near the rear end 24 of the housing 20 to facilitate simultaneous movement of the both the electric cord 34 and the fluid supply line.

The inlet connection 64 may include any appropriate coupling for connecting a garden hose to the inlet connection 64. The coupling can include a conventional threaded nipple (not shown) or a conventional ¼ turn bayonet connection. The inlet connection 64 may also include a quick disconnect (i.e., a hydraulic poppet) coupling set of the type that are well known in the art and commercially available from sources such as Snap-Tite Inc. of Erie, Pa. or Gardena Group of Germany. As is known, a quick disconnect coupling set includes a male portion, which is coupled to the inlet of the fluid pump, and a female portion, which is configured to be threadably coupled to the discharge end of the garden hose. The quick disconnect coupling set is preferably configured (e.g., valved) such that fluid does not flow through the female portion when the male and female portions are uncoupled from one another and the male and female portions may be sealingly coupled to (or uncoupled from) one another in a conventional axially-engaging (axially-disengaging) manner while the fluid in the garden hose is under pressure.

A pigtail garden hose may be connected to the inlet portion of the pump, which may include a strain relief. The pigtail routes any potential water leaks at the hose connection away from the operator and to the ground or horizontal surface. The inlet connection 64 may additionally include a strain relief portion.

As noted above, a handle 40 is provided and it extends away from a portion near the rear end 24 of the housing 20. The handle 40 may be formed from the cooperation of the housing shells 28*a*, 28*b* or may be formed to extend from the joined housing shells 28*a*, 28*b*. The handle 40 has a first end 42 that extends from the portion of the housing 20 near the rear end 24 and a second end 44 that terminates in a barrel 50. The inner portion (not shown) of the handle 40 defines a fluid passageway and is fluidly connected with the outlet 66 of the pump 62. The inner portion of the handle 40 may be lined with a metal or other fluid abrasion resistant material.

The barrel 50 has a first end 52 engaged with the second end 44 of the handle 40 and a second end 54 extending in the same direction as the front end 22 of the housing 20. The barrel 50 has a longitudinal axis 56 that is substantially parallel with the longitudinal axis 26 of the housing 20. Desirably, the barrel 50 is spaced from the housing 20 to provide room for a user to grip the barrel 50 without interference from the housing 20. The second end 54 of the barrel 50 receives an end 92 of a lance or wand 90, which are known in the art, to provide a fluid connection between the pump outlet 66 and the outlet of the lance 94. Typically, the exit end of the lance 94 is provided with a fixed or interchangeable nozzle 96 to provide a desired spray pattern.

The inner portion of the barrel 50 is provided with a valve 100 to control the flow of fluid from the pump outlet 66 to the barrel or nozzle outlet. In one embodiment, the valve 100 is a cam-type butterfly valve. The valve 100 may be actuated by one or more switches to provide flexibility in using the pressure washer 100. For example, the handle 40 may be provided with a trigger switch 46 that when actuated will open the valve 100 to permit fluid from the pump outlet 66 to flow through the barrel 50 and out the nozzle 96.

Figure 3:
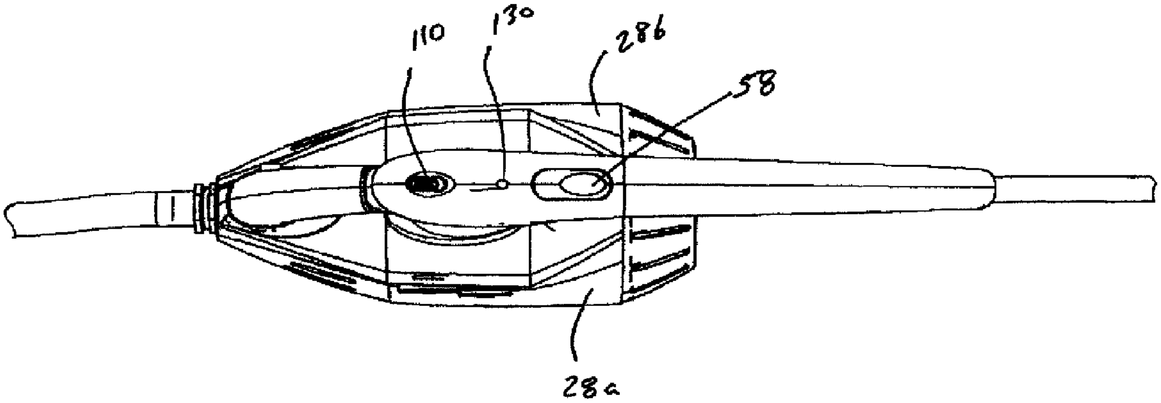
FIG. 3 shows a top view of the pressure washer of FIG. 1.
Figure 4:
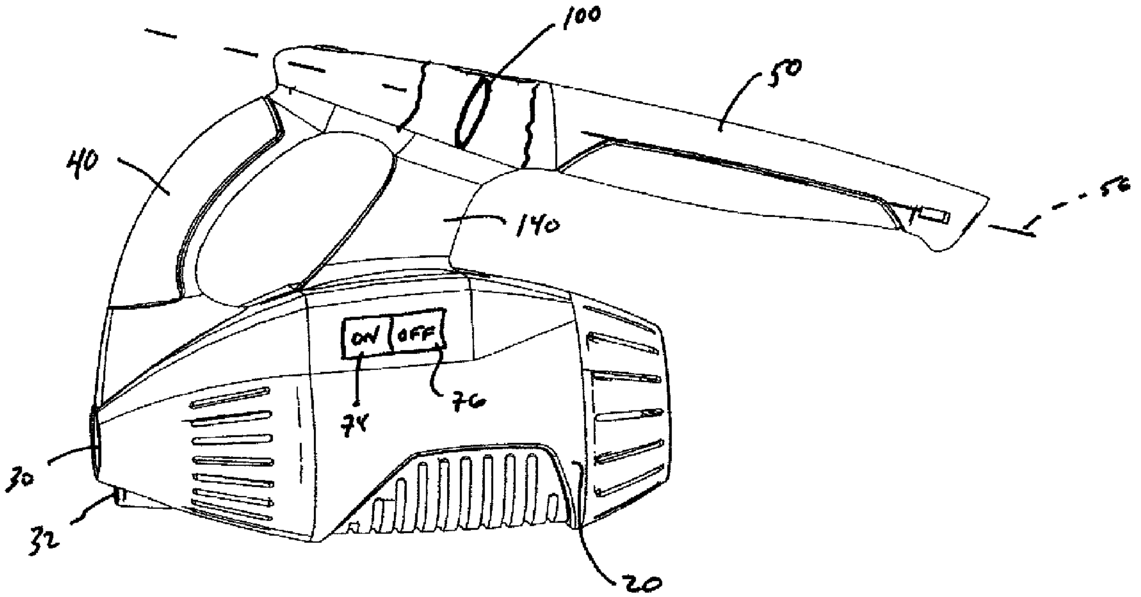
FIG. 4 shows a portion of the pressure washer of FIG. 1.
Figure 5:
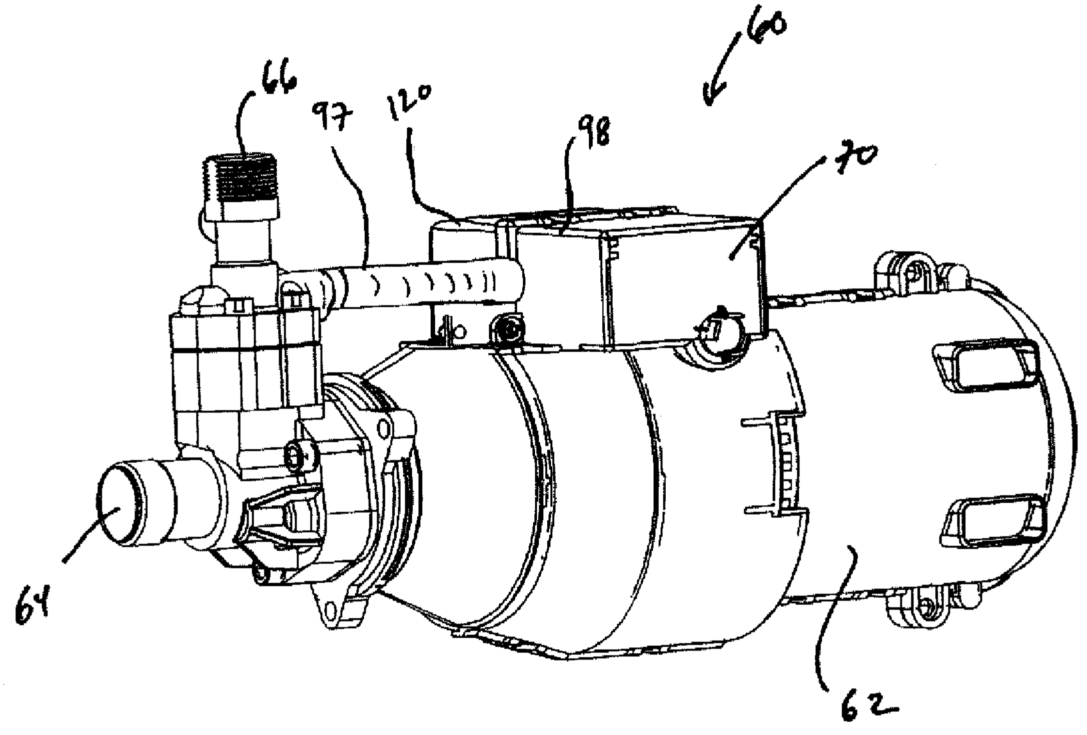
FIG. 5 shows one embodiment of a motor and pump useful in the pressure washer of FIG. 1.
Figure 6:
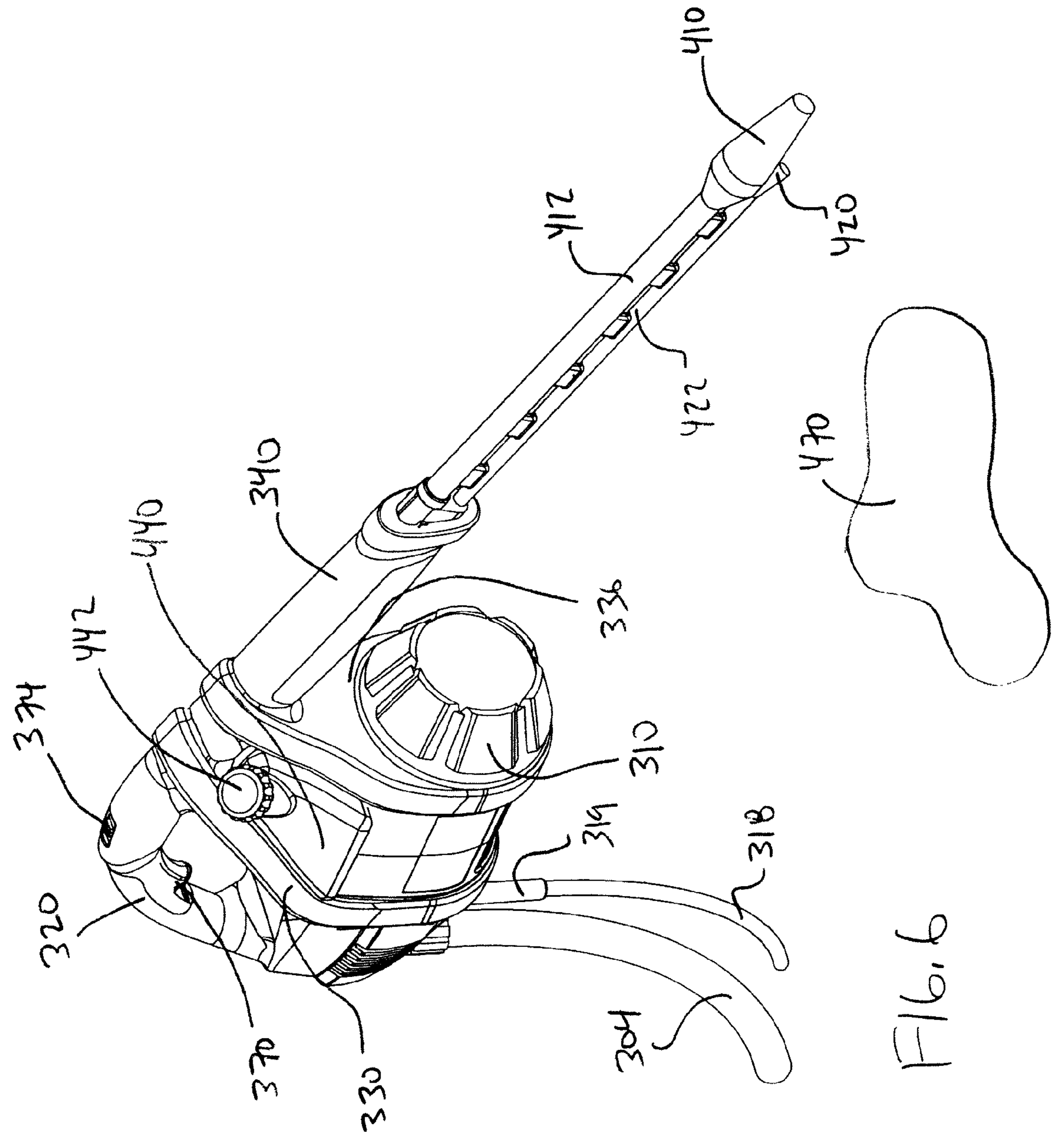
FIG. 6 is a perspective view of a second embodiment of a pressure washer.
Figure 7:
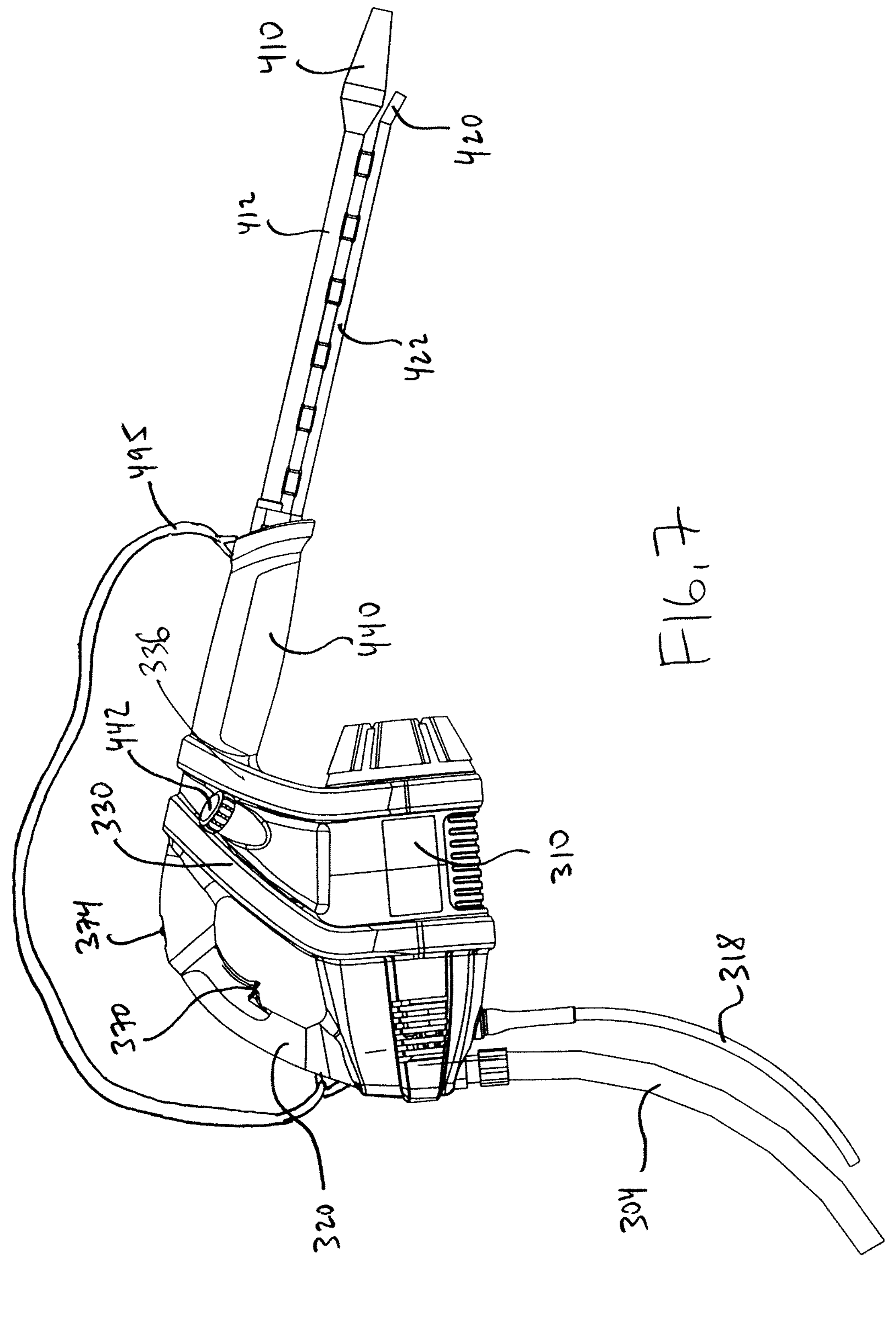
FIG. 7 is a side view of the pressure washer of FIG. 6.
Figure 8:
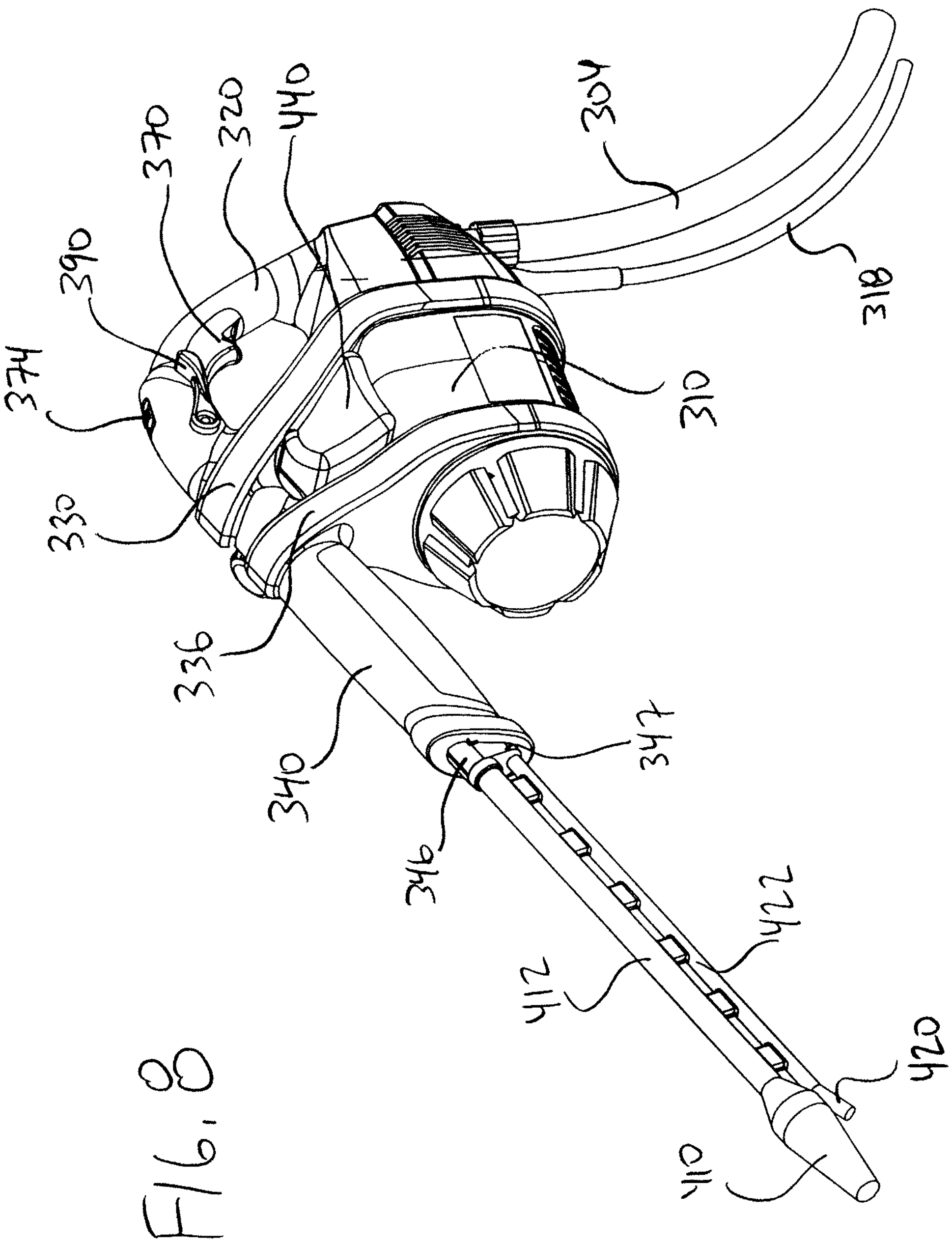
FIG. 8 is an opposite perspective view of the pressure washer of FIG. 6.

Alternatively, and as best seen in FIG. 3, the barrel 50 may be provided with a switch 58, such as a paddle lever, to actuate the valve 100. The barrel switch 58 may be connected to the trigger switch 46. The barrel switch 58 and the trigger switch 46 may be separate parts connected to each other. Alternatively, they can be formed as a single part. The trigger switch 46 could have a central pivot point so that the valve 100 can be activated when either switch 46, 58 is actuated. Desirably, a lockout switch 110 is provided near the handle 40 to lock out both the trigger switch 46 and the barrel switch 58 to prevent the valve 100 from opening when the lockout switch 110 is actuated.

The pressure washer may be provided with a motor controller mechanism 120 such as a controller, switch, micro switch or the like that operates in conjunction with the valve 100 in the barrel 50 to control the motor 70. The motor controller mechanism can be a pressure or flow actuated switch or sensor. In one embodiment, the motor control mechanism 120 can sense back pressure (or lack of flow) resulting from the closed position of the valve 100 and if the motor 70 is running, the motor control mechanism 120 can send a signal to the motor 70 to shut the motor off. As an aid to the user, a visual indicator 130 such as a visible LED may be provided on a convenient location on the housing 20 to provide an indication that the motor 70 is activated. Of course, when the motor 70 is activated through the motor controller mechanism 120 by either activating the trigger switch 46 or the barrel switch 58, the valve 100 will open allowing fluid from the pump outlet 66 to travel through the handle 40, the barrel 50, the lance 90 (if provided) and out the nozzle 96 (again, if provided).

The barrel 50 may have a stanchion 140 connecting a portion of the barrel 50 with a portion of the housing 20. The stanchion 140 may provide a passageway for electrical circuitry, fluid, and controls as desired. In addition, the stanchion 140 can provide further support for the pump mechanism 60 or a further gripping surface.

Optionally, the pressure washer 10 may be provided with a pressure/flow adjustment device for adjusting the pressure of the fluid exiting the device. Pressure adjustment devices are known and further description of such is not required. The pressure adjustment device may be provided downstream of the flow control valve 100 such the when the flow control valve 100 is open, the pressure adjustment device can be actuated to control pressure/flow exiting the pressure washer 10. Alternatively, the pressure/flow adjustment device may be provided upstream of the valve 100. If a pressure/flow adjustment device is provided, it may also be desirable to provide a visual pressure gauge so that the operator can better determine the pressure of the fluid exiting the pressure washer 10.

Also optionally, the barrel 50 may be provided with a selectable coupler to provide a means for coupling a second fluid source to the pressure washer. For example, the selectable coupler may provide a fluid connection to a source of detergent or other material. By properly locating and configuring the coupler, the fluid traveling through the barrel 50 may draw fluid through the selectable coupler, which is desirably located orthogonal to the longitudinal axis of the barrel, so that both fluids exit the barrel 50 (or lance or nozzle, as the case may be). In some embodiments, a pressure reducing nozzle may be employed at the end of the barrel (or lance) to allow the selectable coupler to work effectively to sufficiently lower the fluid pressure within the barrel 50.

In operation, the pump mechanism 60 will be actuated upon actuation of the power switch 72 and because the valve 100 is in a normal closed position, the motor control mechanism 120 will sense that condition and deactuate the pump mechanism 60. Thereafter, either the trigger switch 46 or the barrel switch 58 is actuated and the valve 100 is actuated to an open position which condition is sensed by the motor control mechanism 120 and actuate the pump mechanism 60 to move fluid from the pump inlet 64 through the pump outlet 66, handle 40, past the valve 100 and out the barrel 50. Alternatively, the trigger switch 46 or the barrel switch 58 may be mechanically coupled to the motor control mechanism 120, such that the motor control mechanism 120 maintains the motor secured when the valve is in the closed position. Finally, a pressure switch 98 may be provided within the motor control mechanism 120 that is mechanically operated by a piston 97, or another type of suitable mechanical component, fluidly engaged to the output 66 of the pump 60, wherein the piston 97 is biased against the force of a spring (not shown) to close the pressure when the output pressure from the pump mechanism 60 exceeds a set threshold. When the pressure switch closes due to translation of the piston 97, the pump mechanism 60 is prevented from operating.

It is contemplated that a shoulder strap may be provided to assist the user in carrying and holding the pressure washer 10. The shoulder strap may be attached to the pressure at any desirable location. It is therefore intended that the foregoing detailed description be regarded as illustrative rather than limiting, and that it be understood that it is the following claims, including all equivalents, that are intended to define the spirit and scope of this invention.

Turning now to FIGS. 6-14, a second representative embodiment of a pressure washer 300 is provided. The pressure washer 300 includes a housing 310, a handle 320, a barrel 340, a first nozzle 410, and a second nozzle 420. The first and second nozzles 410, 420 each provide an independent stream of fluid leaving the pressure washer 300. A fluid passageway 360 is provided within the pressure washer 300 between a fluid inlet 311 and the first and second nozzles 410, 420. Specifically, the fluid passageway 360 includes a first branch 364 forming a flow path from the fluid inlet 311, through the fluid pump 312, the housing 320, and the barrel 340 to the first nozzle 410. The fluid passageway 360 additionally includes a second branch 380 forming a flow path from the fluid inlet 311, the housing 310, the handle 320, and the barrel 340 to the second nozzle 420. The flow through the first and second branches is best shown in FIG. 10 and identified as A and B, respectively. In some embodiments, the first nozzle 410 provides a stream of fluid at a relatively high pressure and the second nozzle 420 provides a stream of fluid at a lower pressure. Preferably, all the components of the pressure washer 300 are formed and assembled to allow the pressure washer 300 to be held during operation with a single hand during operation by the user. In some embodiments, a strap 495 may be provided to assist the user in carrying the pressure washer 300.

The housing 310 encloses a fluid pump 312 and a motor 316 that generates and provides the torque to operate the fluid pump 312. The housing 310 may be formed from multiple clam shell type pieces that are assembled together with an adhesive or a plurality of fasteners when the fluid pump 312, motor 316, and auxiliary components are properly assembled within the housing 310. In some embodiments, the housing 310, handle 320, barrel 340, and stanchions 330, 336 (discussed below) may be formed from two clamshell pieces that may be attached or connected together with fasteners or adhesive to form the rigid body of the pressure washer 300. In other embodiments, these components may be formed independently (with clamshell pieces) and connected together.

The motor 316 may be operated by AC or DC electric current or in other embodiments, the motor 316 may be a combustion engine that is powered by gasoline or another combustible fuel. As is known, the motor 316 that operates from AC current includes a cord 318 that extends out of the housing 310 that includes a plug (not shown), which can be connected to a conventional AC current source. The electric cord 318 may be connected to the housing with a strain relief connector 319, as is known in the art. Additionally, a coupler, or connector, 308 may be provided that connects the hose 304 (discussed below) and the cord 318 together for simplicity and convenience.

In embodiments where the motor is powered from a DC source, the housing 310 receives a removable rechargeable battery (not shown) to provide DC current to the motor 316. The output shaft of the motor 316 may be connected to the fluid pump 312 in any conventional manner, including direct connection between the motor 316 and fluid pump 312 shafts, gear reduction, belt drives, etc. A motor controller circuit 450 may be provided with motors 316 that operate from AC current or DC current to selectively allow current flow to the motor 316 to control the operation of the motor 316 and the pressure washer 300 based on one or more operational parameters. The detailed operation of the motor controller circuit 450 is discussed below and shown schematically in FIG. 14.

The fluid pump 312 may be any type of conventional fluid pump 312 that is known to those of skill in the art. For example, the fluid pump 312 may include an internal wobble plate (not shown) that is connected to a shaft in rotational connection with the motor shaft. The fluid pump 312 may additionally include a plurality of spring loaded radial pistons (not shown) that are translatable within respective chambers (not shown) based on the rotation of the wobble plate. The movement of each respective piston compresses fluid within the piston chamber, causing the fluid pressure within the chamber to increase. Fluid enters the respective piston chamber from the pump inlet 313, which is connected to the fluid inlet 311. The piston chambers may be held shut with spring loaded check valves (not shown), which are opened when the fluid within the cylinder exceeds the biasing force of the spring. Piping within the fluid pump 312 directs the fluid leaving the respective cylinder to the pump outlet 314. In other embodiments other types of pumps, such as a diaphragm pump may be used.

In one embodiment, the fluid pump 312 is capable of providing a fluid flow between about 0.5 to 5 gallon per minute (gpm), desirably between 0.75 and about 2.5 gpm, more desirably between about 1.0 and 1.6 gpm. The fluid pump 312 may also provide an outlet pressure at the pump outlet 314 in the range between about 300 psi to about 2000 psi, desirably between about 700 and 1600 psi, more desirably between about 900 to about 1500 psi. As can be understood, the actual flow rate, and outlet pressure, through each of the first and second branches 364, 380 and out of the pressure washer 300 is a function of the incoming flowrate, the diameter of water supply piping 304, the supply pressure through the fluid inlet connector 311, the orifice size, type, and shape of the nozzles 410 and 420, the diameter of the fluid passageway 360, and fluid pump 312 capacity. Because the head loss within the first branch 364 is limited, the flow rates and output pressures of the fluid pump 312, discussed above, are typical of what is expected at the first nozzle 410. Typical fluid pressures through the second nozzle 420 may be in the range of about 40 psi to about 100 psi, and preferably in the range of about 40 psi to about 80 psi. The range of fluid pressures through the second nozzle 420 is a function of the fluid supply pressure to the pressure washer. As understood by those of ordinary skill in the art, a higher fluid supply pressure yields a higher output fluid pressure through the second nozzle 420.

As best shown in FIG. 10, the housing 310 includes fluid piping for both of the first and second branches 364, 380 of the fluid passageway 360. Specifically, the housing 310 includes the fluid inlet 311, which includes a conventional connector to receive fluid from a hose 304, such as a garden hose. The fluid passageway 360 includes a connector 362, such as a “T” connector, downstream of the fluid inlet 311 which divides the fluid into two independent flow paths (i.e. the first branch 364 and the second branch 380). Downstream of the connector 362, a first branch 364 is connected to the pump inlet 313, and a second branch 380 bypasses the fluid pump 312 and is directly connected with piping out of the housing 310. The first branch 364 extends from the pump outlet 314 to connecting piping within a first end 322 of the handle 320. The fluid inlet connector 311 may include a skirt 306 that surrounds the distal end of the hose 304 and the fluid inlet connector 311, to minimize fluid leakage from this connection.

The handle 320 includes a first end 322 that is connected to a rear end of the housing 310 and a second end 324 that extends toward the forward end of the pressure washer 300. The handle 320 may extend from the housing 310 substantially perpendicular to the longitudinal axis 319 of the housing 310. The handle 320 may be formed from multiple clam shell components that may be connected together after the components of the handle 320 are properly installed and connected. The handle 320 provides an ergonomic structure for the user to hold when the pressure washer 300 is in use because the handle 320 is formed to be easily gripped by users in multiple different positions.

Figure 9:
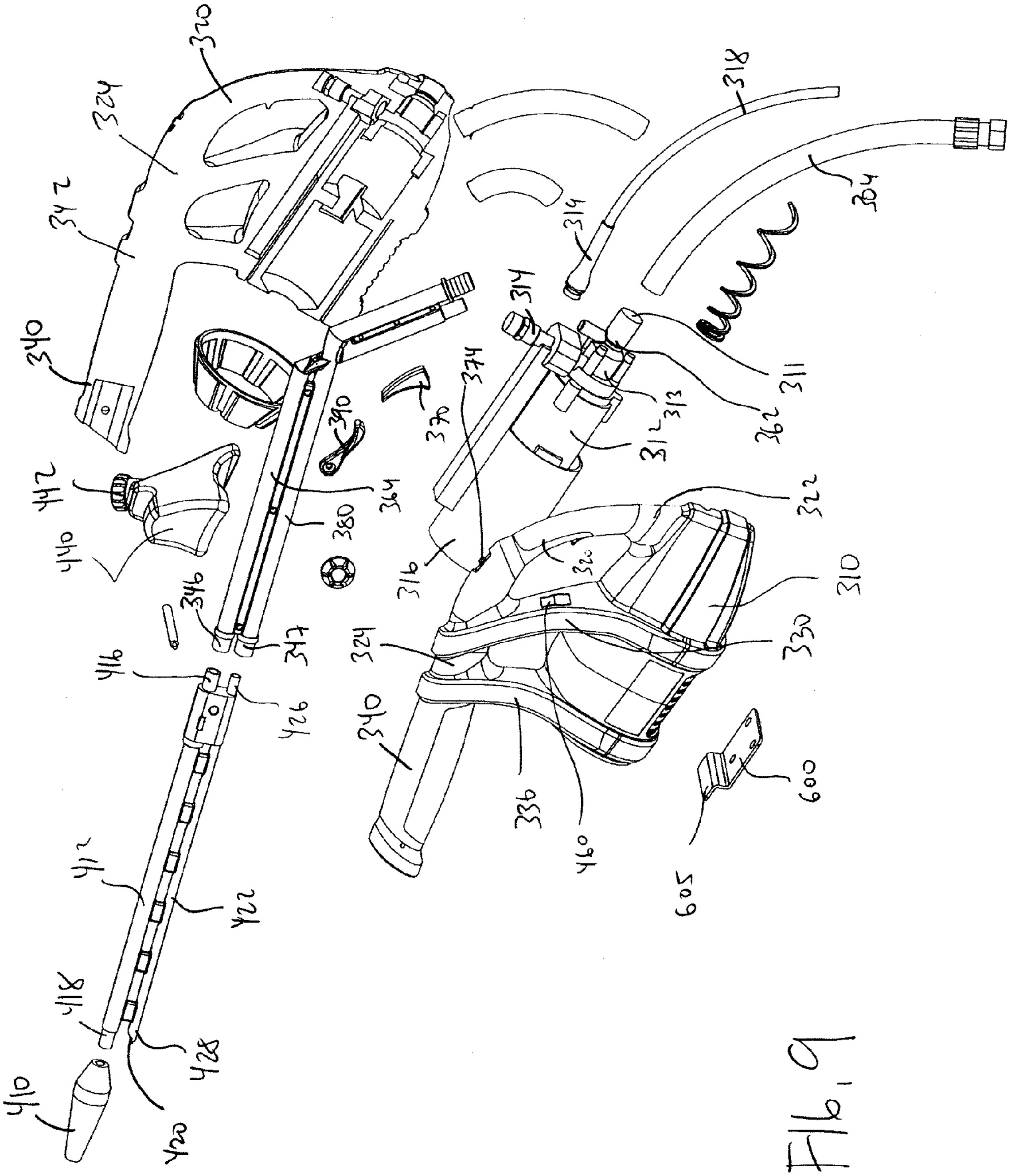
FIG. 9 is an exploded view of the pressure washer of FIG. 6.
Figure 1D:
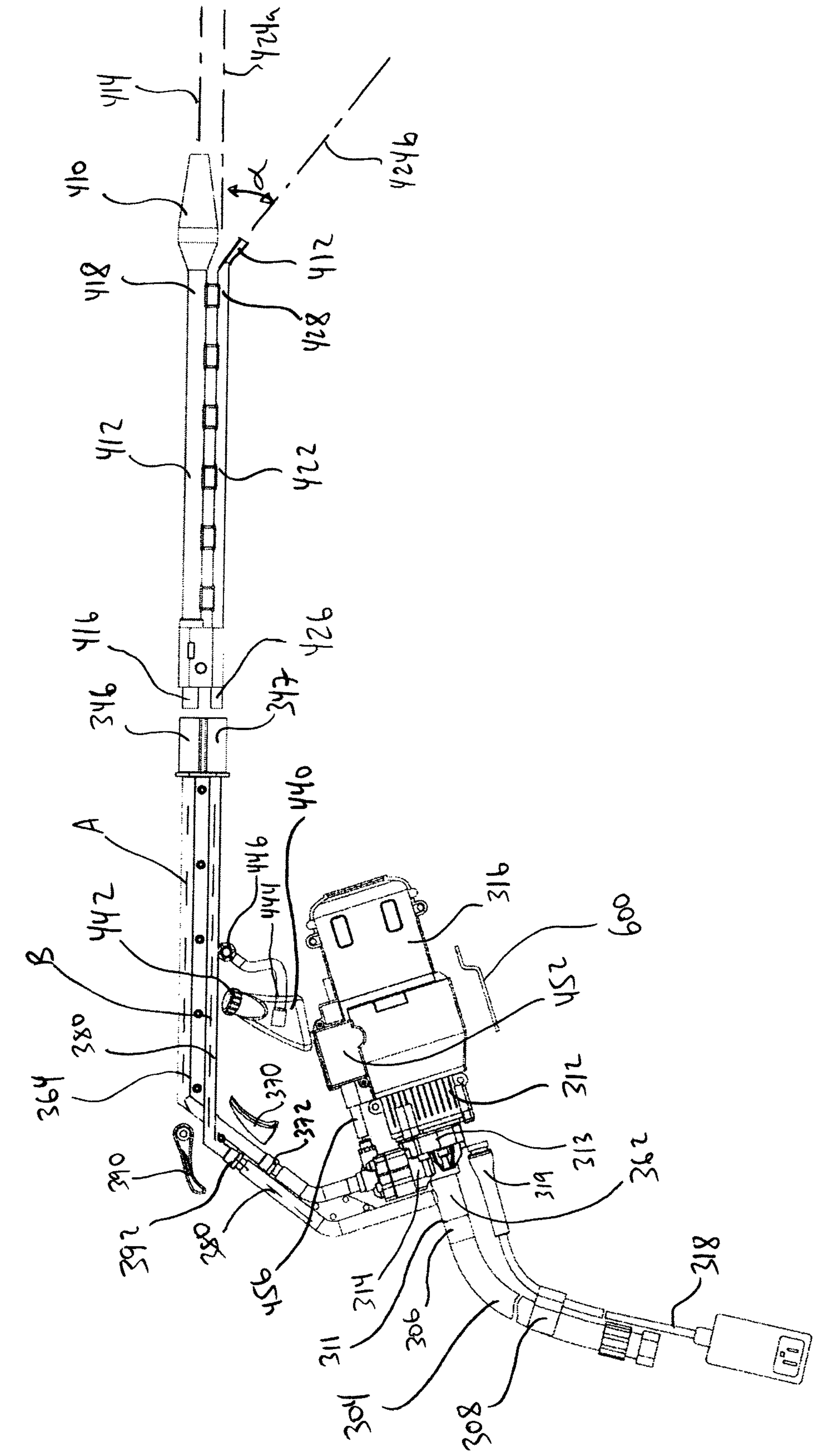
Figure 11:
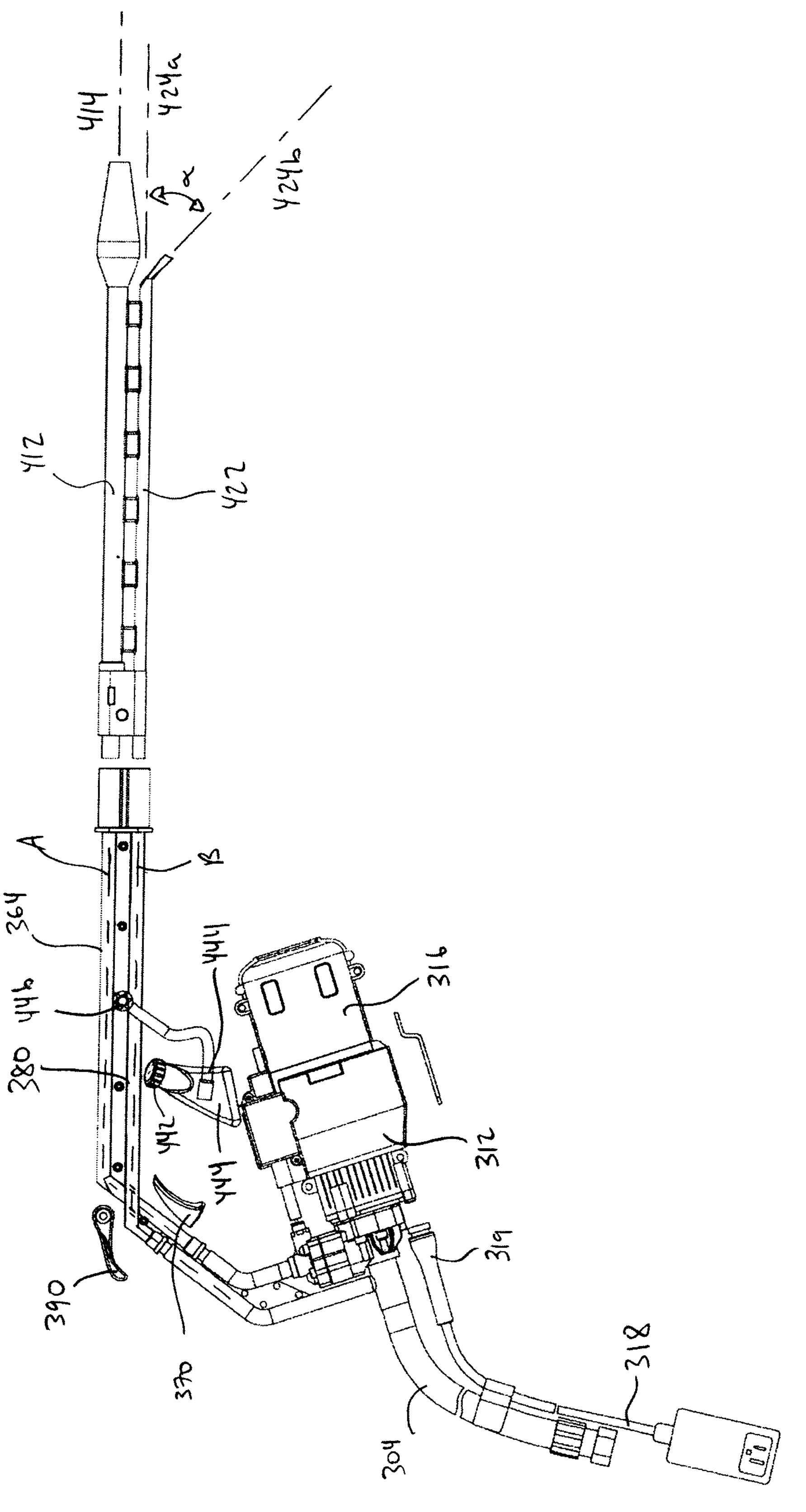
FIG. 11 is a side view of the pressure washer of FIG. 10 with the fluid container connected to the first branch of the fluid passageway.

The handle 320 includes piping that forms a portion of the first branch 364 of the fluid passageway 360 through the pressure washer 300. Specifically, the piping forming the first branch 364 is connected with the pump outlet 314. The first branch 364 extends through the length of the handle 320 and connects with first branch piping 364 within the barrel 340. As shown in FIGS. 9-11, the handle 320 additionally may enclose a portion of the second branch 380 and connect with the second branch 380 piping within the barrel 340. The handle 320 additionally includes a first actuator 370, which may include a lock out 374 to prevent spurious and unintended operation of the first actuator 370, and a second actuator 390. The first actuator 370 controls the position of a first valve 372 located in the first branch 364 within the handle 320. The second actuator 390 controls the position of a second valve 392 located in the second branch 380 of the fluid passageway 360. A lock on switch 394 may be operatively connected to the second actuator 390 to allow the second actuator 390 to be retained in a position to maintain the second valve 392 in the open position.

The first actuator 370 may be a trigger type actuator that controls a cam type valve pivotably connected to the handle 320. The first valve 372 may be a spring loaded butterfly valve, a gate valve, a globe valve, or a ball valve, or other types of suitable valves to provide a sufficient seal against a large differential pressure across the first valve 372. The first actuator 370 may be spring loaded to a position where the first valve 372 is shut, preventing flow through the first branch 364 when the first actuator 370 is not specifically pressed by the user. When the first actuator 370 is pressed, the first valve 372 opens, allowing flow through the first branch 364 of the fluid passageway 360. As discussed below, the first valve 372 or the first actuator 370 may be operatively engaged with a pressure switch 452 in a motor control circuit 450 to prevent the operation of the motor 316 when the first valve 372 is shut.

The first actuator 370 may include a lock out 374 provided on the handle 320 that is operatively connected with either of the first actuator 370 or the first valve 372 to control the ability to operate the first valve 372 through the first actuator 370. The lock out 374 may be a switch that prevents the first actuator 370 from being activated with the lock out 374 engaged or spring loaded to an enabled position. Alternatively, the lock out 374 may be a slider or push-button or any other means to prevent the first actuator 370 from being pushed or first valve 372 from being operated by first actuator 370. For example, the lock out 374 may be operatively engaged with a push button that slides to prevent motion of the first actuator 370. Alternatively, the lock out 374 may be surrounded by the first actuator 370 and pivotably connected to the handle 320 independently of the first actuator 370. In some embodiments, the first actuator 370 and the lock out 374 may be pivotably connected to the handle 320 with opposite pivot points such that the first actuator 370 and the lock out 374 pivot in opposite rotational directions to prevent the first actuator 370 from operating the first valve 372 if the user grabs the pressure washer 300 by the handle 320 in the vicinity of the first actuator 370. In some embodiments, the lock out 374 may be spring loaded to an enabled position to prevent the operation of the first actuator 370.

A first stanchion 330 is provided between the housing 310 and the handle 320. Specifically, the first stanchion 330 provides mechanical support for the housing 310 from the handle 320 and additionally may enclose a portion of the second branch 380 of the fluid passageway 360 (not shown). In some embodiments, a second stanchion 336 may be provided between the housing 310 and the handle 320 to provide additional mechanical support and may enclose the portion of the second branch 380 (instead of the first stanchion 330 or the handle 320). The second branch 380 may extend through the first handle 320 (FIGS. 9-11), or the first stanchion 330 (FIGS. 13-14) or the second stanchion 336 (not shown) downstream of the portion of the second branch 380 enclosed within the housing 310.

A storage volume 440 may be provided on one of the first or second stanchions 330, 336 or the handle 320. The storage volume 440 encloses a volume of detergent or other type of cleaning fluid for mixing with the fluid flowing through the second branch 380. The storage volume 440 may be integrally or monolithically formed with the first or second stanchions 330, 336 or the handle 320, or may be removable from these components. The storage volume 440 includes an inlet (not shown) that is normally enclosed by a cap 442 to prevent fluid within the storage volume 440 from spilling from the pressure washer 300. The storage volume 440 includes an outlet 444 in fluid communication with the second branch 380, such that fluid exits the storage volume 440 when fluid flows through second branch 380. In some embodiments, the outlet 444 may be a venturi chemical injector that is known in the art or similar device to cause or allow fluid flow from the storage volume 440 to the second branch 380 when fluid flows through the second branch 380 of the fluid passageway 360. The outlet may include an isolation valve 446 that allows the user to selectively allow or prevent fluid flow from the storage volume 440 to the second branch 380, or the first branch 364 as discussed below.

In an alternate embodiment shown in FIG. 11, the storage volume 440 may be in fluid communication with the first branch 364 of the fluid passageway 360 instead of the second branch 380. An isolation valve 446 is provided between the storage volume 440 and the first branch 364. The isolation valve 446 may include a venturi chemical injector valve, or other type of valve that is known in the art, to allow flow from the storage volume 440 to the first branch 364 to mix with the fluid flowing through the first branch 364 leaving the pump 312. The isolation valve 446 may connect to the first branch 364 anywhere downstream of the outlet 314 of the pump 312 preferably downstream of the first valve 372. The isolation valve 446 only allows flow from the fluid container 440 to the first branch 364 when the pressure within the first branch 364 is below a certain level. For example, to allow flow from the storage volume 440 to the first branch 364 a low pressure fan spray nozzle could be provided on the first nozzle 410 (discussed below), to limit the pressure within the first branch 364 for proper operation of the outlet 445.

The handle 320 additionally includes a second actuator 390 that operates a second valve 392 located in the second branch 380 of the fluid passageway 360 preferably upstream of the first stanchion 330. In other embodiments, the second actuator 390 and the second valve 392 may be connected to the first stanchion 330 (or the second stanchion 336) depending on which member encloses the second branch 380 piping between the connector 362 and the barrel 340. The second actuator 390 may be a lock-out type switch, a cam lever switch, or another switch that can be retained in the selected position. Alternatively, the second actuator 390 may be a push button type actuator with an internal cam that operates the second valve 392. The second actuator 390 may be spring loaded to a position where the second valve 392 is shut, but may be capable of being overridden in a position to maintain the second valve 392 open. The second valve 392 may be a butterfly valve, a gate valve, a push button valve, or any other type of valve that is easily operated and does not create a significant differential pressure across the valve. The second actuator 390 may be operatively connected with a second lock out 394 to prevent spurious operation of the second actuator 390 and the second valve 392, which prevents the operation of the second actuator 390 until the second lock out 394 is operated.

A barrel 340 is provided and connected to the second end 324 of the handle 320. The barrel 340 includes a first end 342 that is connected to the handle 320 and an opposite, second end 344 and forms a longitudinal axis 341. The barrel 340 encloses a portion of the first branch 364 of the fluid passageway 360 downstream of the first valve 372. The barrel 340 additionally encloses a portion of the second branch 380 downstream of the second end 324 of the handle 340. The flow path for each of the first and second branches 364, 380 may be formed with parallel tubes or pipes within the barrel 340, or in other embodiments (not shown) the flow paths for each of the first and second branches 364, 380 may be formed from attached or concentric flow paths.

The barrel 340 provides an ergonomic structure for the operator to hold when the pressure washer 300 is in use. The barrel 340 includes a first outlet connector 346 for the first branch 364 and a second outlet connector 347 for the second branch 380. The outlet connectors 346, 347 (not shown in FIG. 10) may receive the first ends 416, 426 of the first and second wands 412, 422 (or lances), which receive fluid flow through the first and second branches 364, 380, respectively. The outlet connectors 346, 347 may be formed from any type of fluid connector known to those of ordinary skill in the art. For example, the outlet connectors 346, 347 may be threaded, formed with two "U-clips" or a double "U clip," or may be formed as male or female quick connect couplers or spring-loaded bayonet-type couplers. The outlet connectors 346, 347 may also be formed with a combination of these types of connectors. Alternatively, as shown in FIG. 9, the first and second wands 412, 422 may be removeably engaged with the outlet connectors 346, 347 on the barrel 340 with a shear pin 397 that is extendable through respective holes 398 in the wands 412, 422 and the barrel 340. In embodiments where the first and second wands 412, 422 are rigidly attached together, the outlet connectors are normally female quick connect couplers, or other types of connectors where the first and second wands 412 and 422 need not be rotated to connect and remove the wands 412, 422 to/from the barrel 340.

As discussed above, a first wand 412 (or lance) is provided to receive fluid flow through the first branch 364 exiting the barrel 340. The first wand 412 includes a first end 416 that engages the barrel 340 and a second end 418 that receives, or is formed with, a first nozzle 410. The first wand 412 extends along a longitudinal axis 414. A second wand 422 (or lance) is provided to receive fluid flow through the second branch 380 exiting the barrel 340. The second wand 422 includes a first end 426 that engages the barrel 340 and a second end 428 that receives, or is formed with, a second nozzle 420. In other embodiments, the second end 428 of the second wand 422 may simply include an aperture to allow the fluid flowing through the second branch 380 to leave the second wand 422. In still other embodiments, other structures known in the art to guide flow from a pipe may be used at the second end 428 of the second wand 422.

A first portion of the second wand 422 extends along a first longitudinal axis 424*a* and a second portion of the second wand (at the second end 428) extends along a second longitudinal axis 424*b*. The first ends 416, 426 of each of the first and second wands 412, 422 are formed with corresponding structures to fluidly engage the outlet connectors 346, 347 of the barrel 340. In some embodiments, the first and second wands 412, 422 are rigidly connected together and are formed of integral or monolithic components. In other embodiments, the first and second wands 412, 422 are formed from separate components and are either connected together by an external connector, or held in their correct orientation by their connection to the respective connector 346, 347 on the barrel 340.

The first longitudinal axis 424*a* of the second wand and the longitudinal axis 414 of the first wand 412 are substantially parallel to the longitudinal axis 341 of the barrel 340. As shown in FIG. 10, the second longitudinal axis 424*b* of the second wand 422 extends at an acute angle $\alpha$ to the longitudinal axis 414 of the first wand 412. The first and second wands 412, 422 are formed such that fluid streams exiting each of the respective first and second nozzles 410, 420 do not substantially intersect when exiting the first and second nozzles 410, 420. Specifically, as discussed above, the fluid flowing through each of the first and second branches 364, 380 and leaving the respective first and second nozzles 410, 420, is normally at significantly different pressures. If the two fluid streams were allowed to interact immediately after exiting the two nozzles 410, 420, turbulent flow would be created, which would reduce the impact pressure of the relatively high pressure fluid flow leaving the first nozzle 410 and would alter the spray pattern of the pressurized fluid flow from the first nozzle 410.

In some embodiments, the fluid streams does not substantially intersect prior to contacting the work surface when the pressure washer 300 is positioned in a normal operating orientation (with the user holding the handle 320 such that the first and second wands 412, 422 are angled toward the work surface or the ground). In other embodiments, the fluid flows from the first and second nozzles 410, 420 and does not substantially intersect until the flow reaches a specific distance from the nozzles 410, 420. For example, this range may be between about 5 inches and about 20 includes, desirably between about 8 inches and 15 inches, more desirably between about 8 inches and about 10 inches. As can be understood, this distance is a function of the type of nozzles used on nozzles 410, 420 and the orientation that the pressure washer 300 is held in use.

During use of the pressure washer 300, the spray from the second nozzle 420 contacts the work surface 470 just rearward of the point of contact of the spray from the first nozzle 410 when the pressure washer 300 is held in a normal orientation, and if both actuators of the first and second valves 370 and 392 are operated to allow fluid flow through both of the first and second branches 364, 380. In other words, the point where the spray from the second nozzle 420 contacts the work surface 470 slightly closer to the nozzles 410, 420 than the point where the spray from the first nozzle 410 contacts the work surface.

The pressure washer 300 may be operated in several different ways, depending on the specifics of the task. The pressure washer may be operated in a high pressure mode, with spray from only the first nozzle 410, by opening only the first valve 372. The pressure washer 300 may also be operated in low pressure mode, with spray from only the second nozzle 420, by operating only opening only the second valve 392. Alternatively, the pressure washer 300 may be operated in combination mode, with the user opening both the first and second valves 372, 392 to provide relatively high pressure spray flow from the first nozzle 410, and relatively low pressure, but relatively high flowrate flow, from the second nozzle 420. It is also possible to operate the pressure washer 300 with constant flow from either the first or the second nozzles 410, 420 with intermittent flow from the opposite nozzle. Finally, the pressure washer may be operated in any of the above manners with detergent or other type of fluid injected into either the flow through the first or second nozzles 410, 420 from the storage volume 440 during operation.

The first and second wands 412, 420 are each provided with nozzles 410, 420 at the second end 418, 428 of each wand. The first and second nozzles 410, 420 may be removable from the second end 418, 428 of each wand, or the first and second nozzles 410, 420 may be integrally or monolithically formed with the second end 418, 428 of the respective wand 412, 422. The first nozzle 410 may be formed from a plurality of types of nozzles that are suitable for relatively high pressure fluid flow. For example, the first nozzle 410 may be a zero degree pencil nozzle, a turbo or oscillating pencil jet nozzle, a fan nozzle, a multi-spray nozzle, an adjustable pressure or flow nozzle, an adjustable fan spray nozzle, or a combination of these nozzles in one unit, as is known in the art. The second nozzle 420 is normally a fan nozzle, although other the other types of nozzles may also be successfully implemented. In some embodiments, the second nozzle 420 is formed as a throttle valve or in series with a throttle valve to limit the flow through the second nozzle 420, which raises the pressure of the flow through the second nozzle 420, while limiting the fluid flow rate. The throttle valve may be a needle valve, a gate valve, a glove valve, or any other type of valve to lower the flow through the wand 422 and out the second nozzle 420. In other embodiments, the second nozzle 420 may be formed to minimize any flow restriction within the nozzle to maximize the flow rate through the second nozzle 420.

In embodiments where the first and second nozzles 410, 420 are removable from the respective wand 412, 422, the wand and nozzle may be connected with a threaded connection, a hydraulic quick connect coupler, or spring-loaded bayonet type coupler, or other types of connection apparatuses to hydraulically connect the components that are known in the art. Preferably, the second nozzle 420 and second end of the second wand 428 include mechanical structures or interlocks to require the second nozzle 420 to be connected to the second wand 422 such that the planar spray (when the fan type nozzle is used) is oriented to not immediately contact the fluid flow from the first nozzle 410 after the two fluid flows leave their respective nozzles. In other embodiments, the second wand 422 and second nozzle 420 may each include reference marks to aid the user in correctly installing the second nozzle 420 on the second wand 422.

As described in the embodiment above, a motor controller circuit 450 (shown schematically in FIG. 14) may be provided between the motor 316 and the electrical power source. Specifically, the motor controller circuit 450 may be a controller circuit, a switch, a microswitch or the like that operates to control the current flow to the motor 316. The motor controller circuit 450 may include a pressure or flow actuated switch or sensor that operates a contact or switch in the circuit. In one embodiment, the motor control circuit 450 includes switches or contacts operated by relays that sense back pressure (or lack of flow) resulting from the closed position of the first valve 372 and if the motor 316 is running, the motor control circuit 450 interrupt current flow to the motor to secure the motor 316. In other words, the motor controller circuit 450 interrupts current flow to the motor 316 when the fluid flow in the first branch 364 between pump outlet 313 and first valve 372 is substantially restricted (causing pressure in this portion of the first branch 364 to substantially rise), or a substantially high fluid pressure condition occurs between the pump output 313 and the first valve 372.

In some embodiments, a pressure actuated piston 456 is fluidly connected with first branch 364 upstream of the first valve 372 and to selectively reciprocate with the aid of a biasing spring (not shown). A line pressure switch 452 is provided in series within the motor control circuit 450, such that when a high pressure is maintained within the first branch 364 in the vicinity of the pressure actuated piston 456, the pressure actuated piston 456 translates within its cylinder toward the line pressure switch 452 against the biasing force of the spring. The high pressure setpoint for the operation of the pressure actuated piston 456 is a function of the spring constant of the biasing spring and is selected to be a pressure above the high end of the normal range of pressures of the first branch 364, discussed above. With sufficient movement of the pressure actuated piston 456, the line pressure switch 452 opens, which interrupts current flow to the motor 316. When the pressure within the first branch 364 in the vicinity of the pressure actuated piston 456 is reduced, the biasing spring translates the piston 456 away from the line pressure switch 452, which closes.

Figure 12:
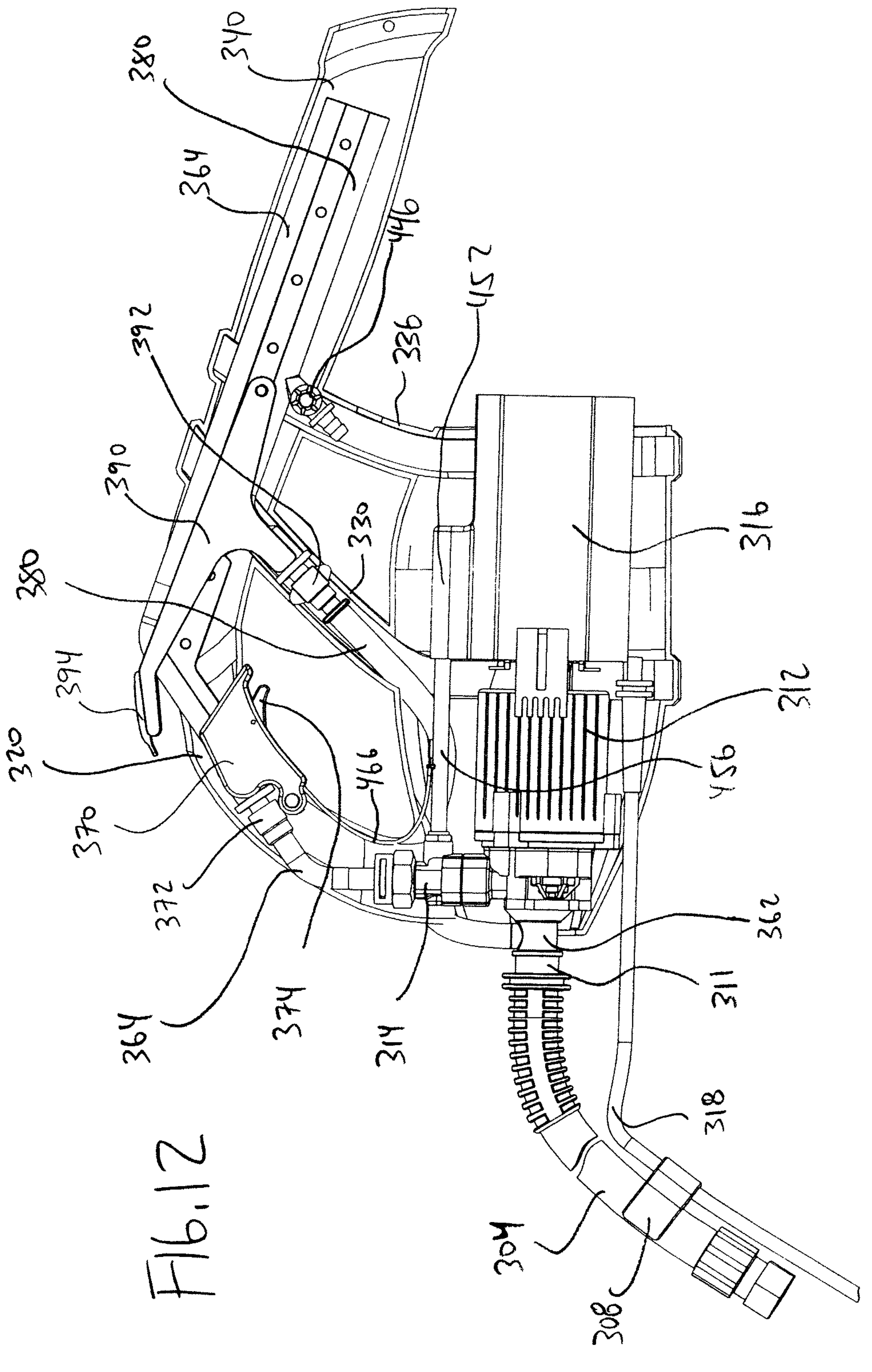
FIG. 12 is a side view of the pressure washer of FIG. 6 with the first and second valves shut.
Figure 13:
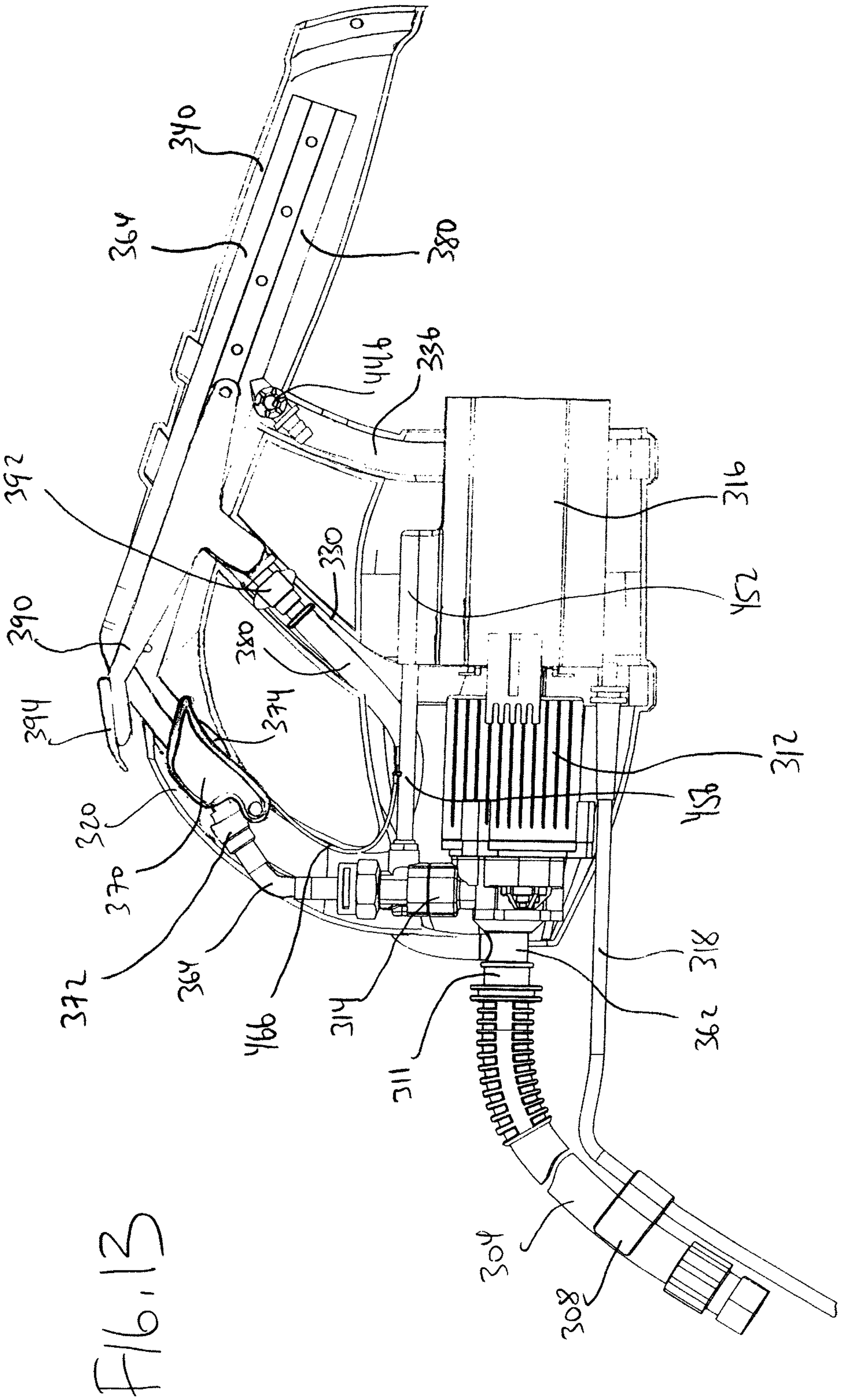
FIG. 13 is the view of FIG. 12 with the first and second valves open.
Figure 14:
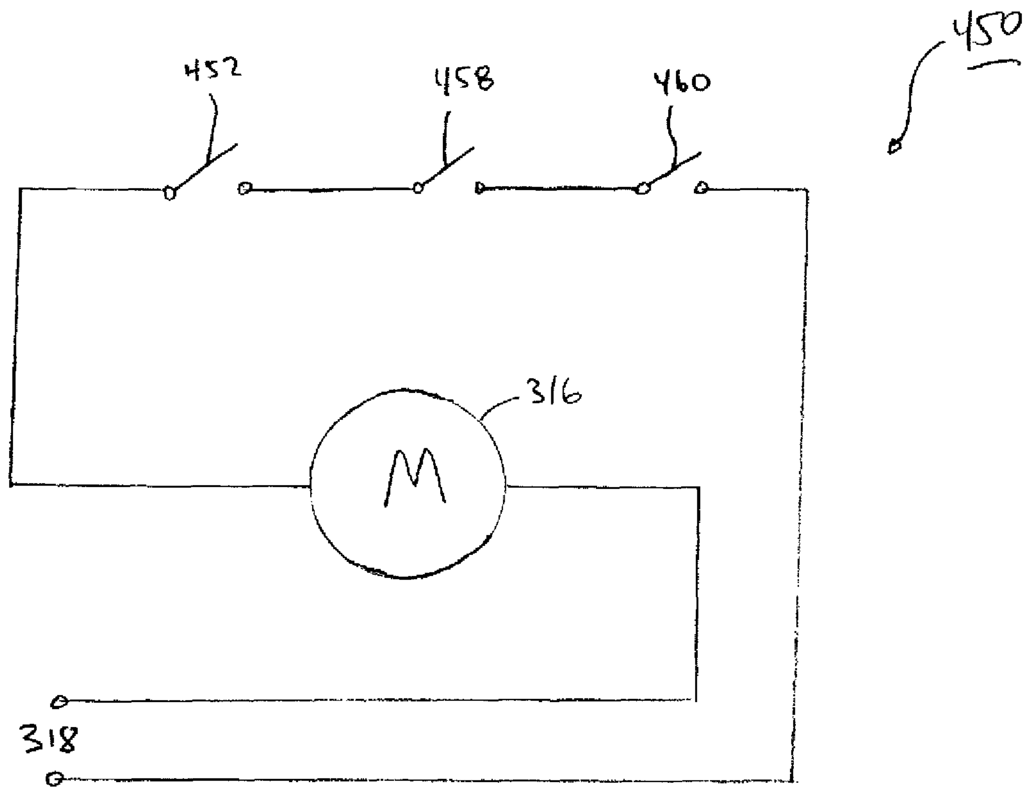
FIG. 14 is an electrical schematic of the motor controller circuit.

In some embodiments, the first actuator 370 may be mechanically coupled to the pressure actuated piston 456 or directly with the pressure switch 452 such that the pressure switch 452 is shut when the first valve 372 is shut. As shown in FIGS. 12 and 13, the first actuator 370 may be mechanically connected with the pressure switch 452 with a cable 466, similar to a bicycle brake cable or any other suitable mechanical linkage. In still other embodiments, a flow detector, or a pressure detector may replace the pressure actuated piston 456 to selectively operate a switch in the motor control circuit 450 to selectively secure the motor 316 and the pump 312 when there is a high pressure within the first branch 364 or low flow within the first branch. In other embodiments, the first valve 372 may have a valve position sensor that operates a contact or a switch 458 in the motor control circuit 450. Specifically, when the first valve 372 is open, the contact or switch 458 in the circuit is shut, which allows current flow between the current source and the motor 316. When the first valve 372 is shut, the contact or switch 458 opens to prevent current flow to the motor 316.

As shown in FIG. 9, a manual on/off switch 460 may be provided on the pressure washer 300 to allow the operator to provide an independent means to prevent the motor 316 to operate the pump 312. The on/off switch 460 is electrically connected in series between the motor 316 and the current source to allow current flow to the motor 316 when the on/off switch 460 is in the on position. The on/off switch 460 may be provided anywhere on the housing 310, including the handle 320 or the first stanchion 330, to allow for ergonomic operation of the on/off switch 460.

The pressure washer 300 may be provided with a bracket 600 to allow for convenient mounting to a wall for storage. Specifically, an L or Z shaped bracket 600 (best shown in FIG. 9) may be mounted to a wall with a plurality of fasteners. The housing 310 may be formed with a recess (not shown) that receives an extended portion 605 of the bracket 600 to rest the housing 310 of the pressure washer on the bracket 600. The recess may be formed so that the pressure washer 300 may be mounted with the wands 412, 422 extending upward or downward from the remainder of the housing 310, or any other ergonomically desirably direction.

The pressure washer 300 is desirably designed such that the center of gravity is located within the portion of the housing 310 that encloses the motor 316 and the pump 312. With this position of the center of gravity, the wands 412, 422 of the pressure washer 300 tend point at an oblique angle to the ground or the floor 470 when the user holds the handle 320 of the pressure washer 300 with a single hand with their arm extended. Accordingly, when the user holds the pressure washer 300 in this manner, the wands 412, 422 and the nozzles 410, 420 are extended in the correct direction for use on the ground. Accordingly, the pressure washer 300 can be held and manipulated with the least amount of effort and coordination when being used on the ground.

Figure 15:
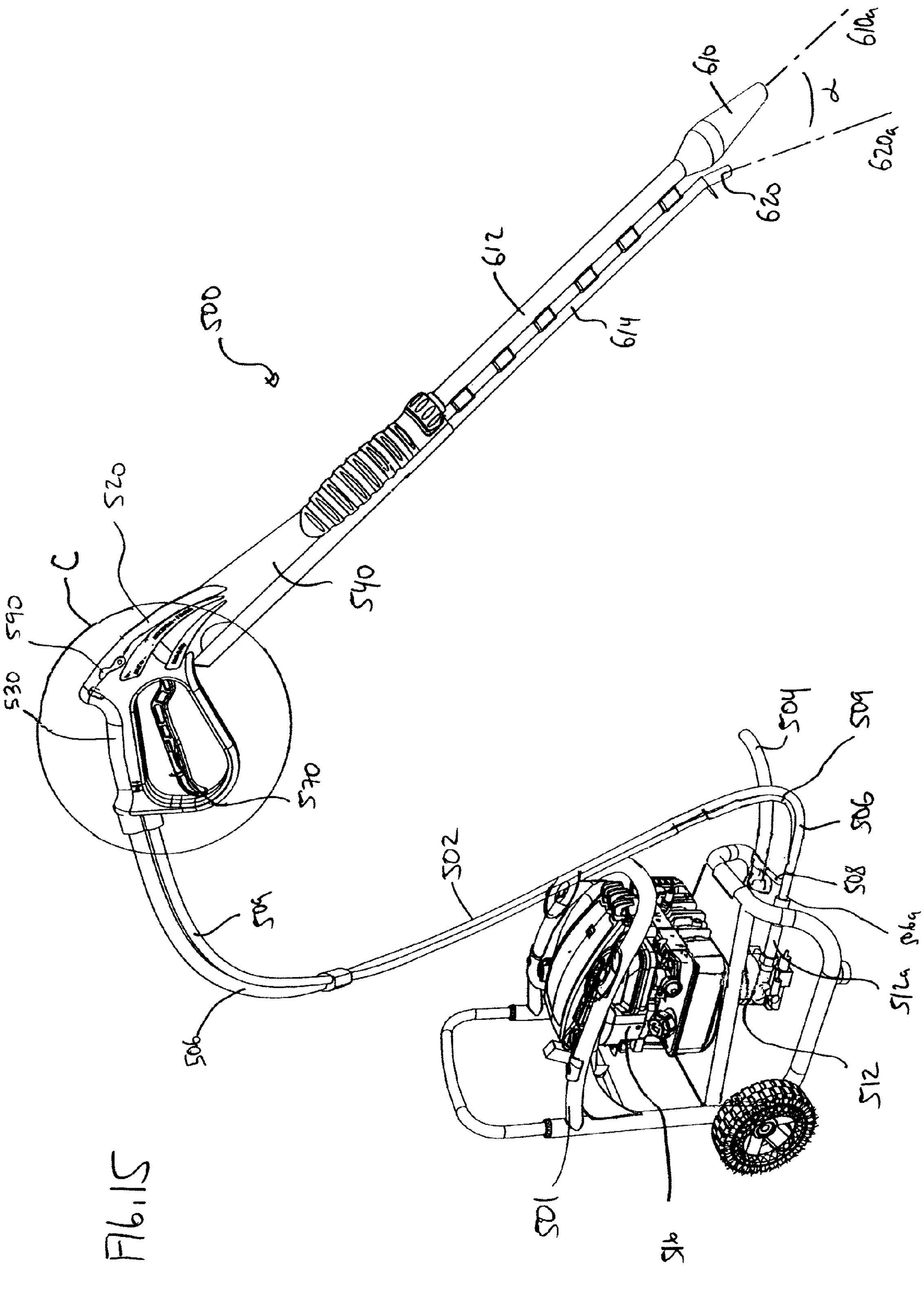
FIG. 15 is a perspective view of a third embodiment of a pressure washer.
Figure 16:
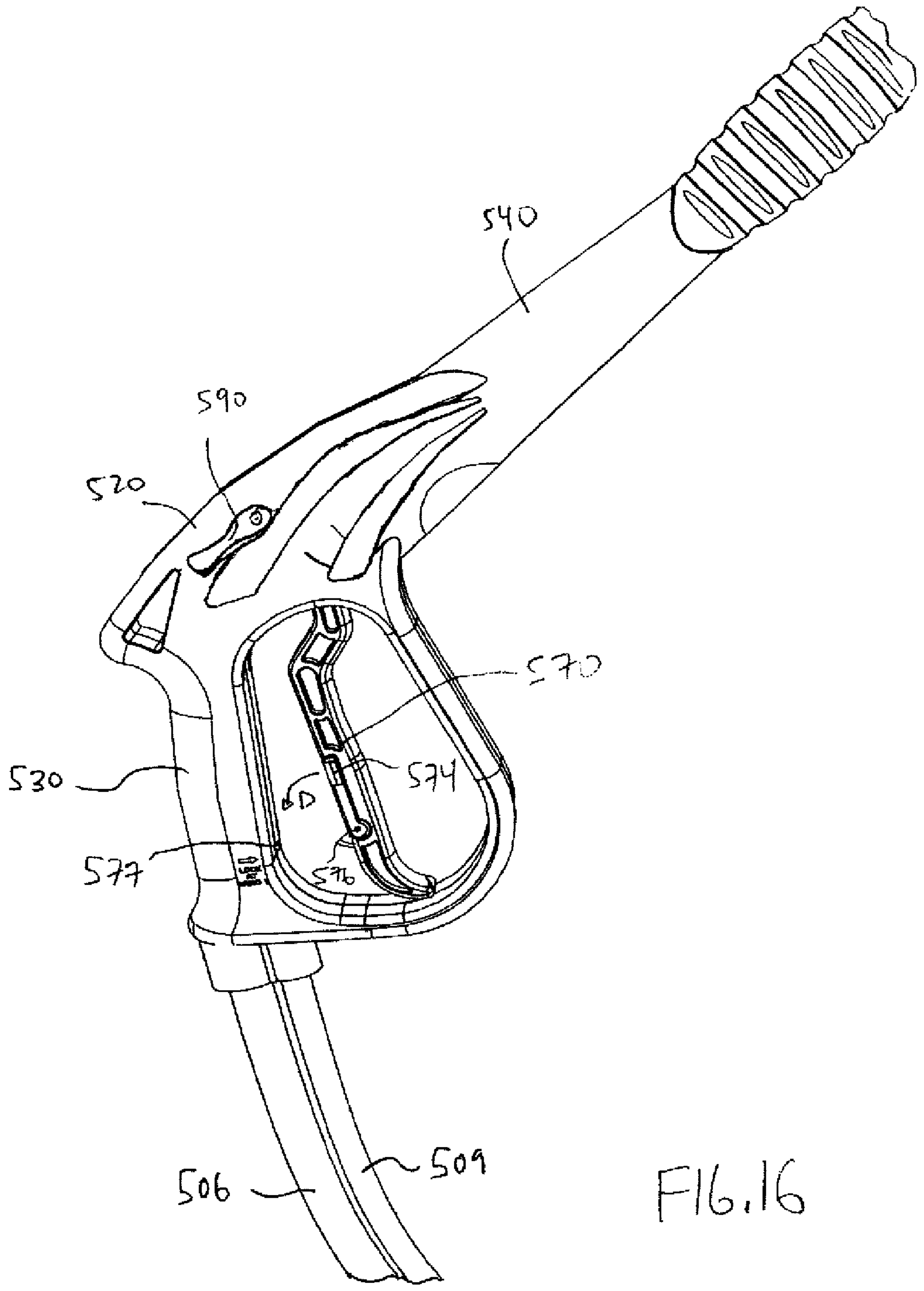
FIG. 16 is a detail view of a portion of the pressure washer of FIG. 15, showing a detailed view of the handle of the pressure washer.

Turning now to FIGS. 15 and 16, a third embodiment of a pressure washer 500 is provided. The pressure washer 500 includes a hose 502 capable of transferring two discrete flows of fluid from the pressure washer base 501 to the spray gun 520. The hose, or conduit, 502 is preferably formed with a first hose section 506 and a second hose section 509, which provide for flow from the pressure washer base 501 to the spray gun 520. A first end 506*a* of the first hose section 506 is connected directly to the output 512*a* of the pump 512. As with conventional pressure washers, the pump 512 increases the pressure of liquid provided through an input connection 512*b* of the pump 512, which is normally connected to a source of fluid in an input hose or a pipe 504, such as a garden hose 504. Typical pumps 512 for use in the pressure washer base 501 are discussed in the embodiments above. The pump 512 is operated by an electric (either AC or DC powered) motor or an engine 516, which provides a prime mover to rotate the pump 512.

As shown in FIG. 15, the pressure washer 500 includes a bypass line 508, which provides a flow path for fluid through the input hose 504 to the first end 509*a* of the second hose section 509. Accordingly, the fluid that flows through the second hose section 509 is not affected by the operation of the pump 512, such that the pressure of the flow through the second hose section 509 is substantially the same as the pressure of the fluid flowing through the input hose 504. Accordingly, the flow through the first hose section 506 is at a relatively high pressure based on the operation of the pump 512, and the flow through the second hose section 509 is at a relatively low pressure, that is substantially the same as the inlet pressure of the fluid through the input hose 504.

Figure 16A:
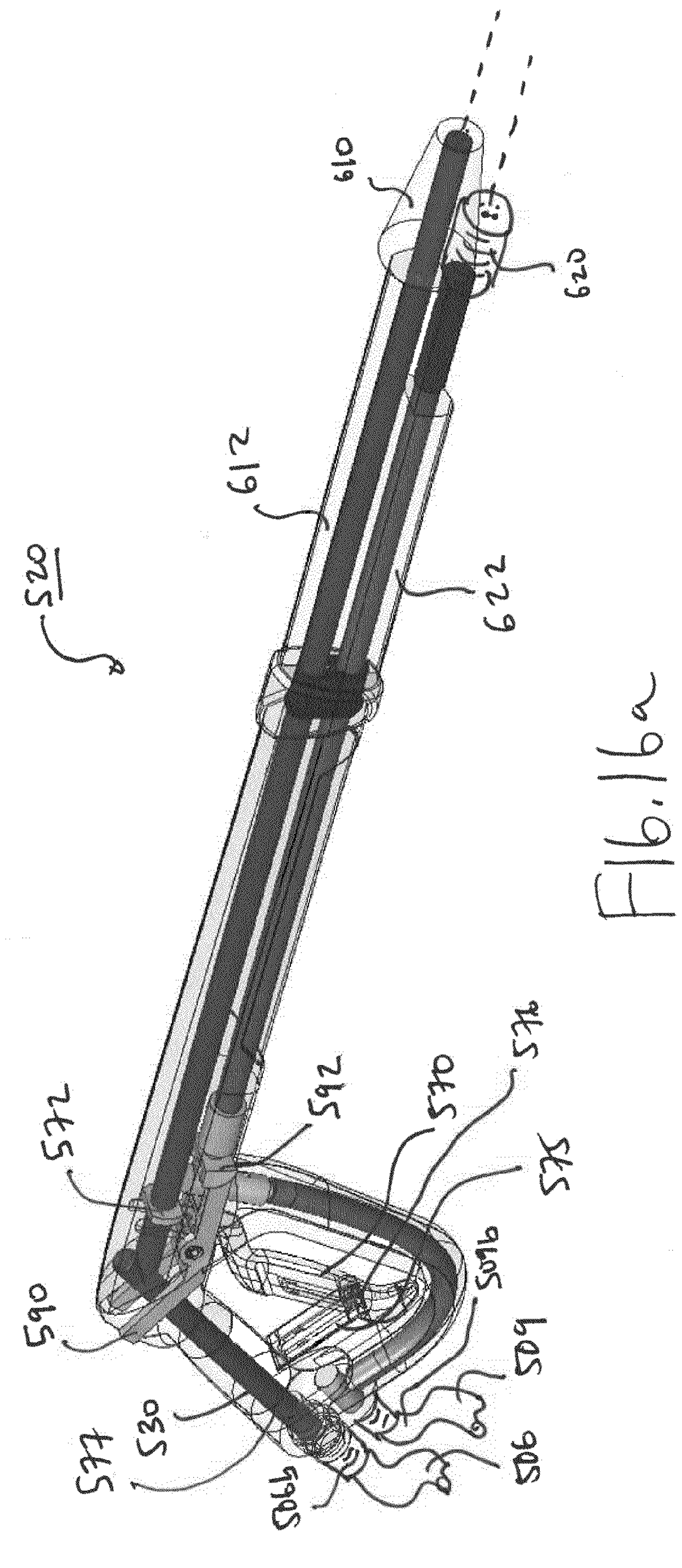
FIG. 16*a* is a perspective view of another spray gun used with the pressure washer of FIG. 15.

A second end 506*b*, 509*b* of each of the first and second hose sections 506, 509 are each connected to the spray gun 520, as shown in FIG. 16*a*. The spray gun 520 includes a handle 530 and at least a first actuator 570, which operates substantially as the first actuator 370 discussed above, and a second actuator 590, which operates substantially the same as the second actuator 390 discussed above. As with the embodiments discussed above, the first actuator 570, operates a first valve 572 (similar to the first valve 372 discussed above) to selectively allow flow through the spray gun 520 and ultimately through the first wand 612 and first nozzle 610. The first valve 572 may be a lift valve, an inline cam valve, a gate valve, a butterfly valve, or other types of valves known to provide reliable fluid isolation with a relatively high differential pressure thereacross. Similarly, the operation of the second actuator 590, operates a second valve 592 (similar to the second valve 392 discussed above), which selectively allows fluid flow through the second wand 622 and ultimately through the second nozzle 620. The second valve 592 may be a lift valve, an inline cam valve, or other valves that are suitable for low pressure fluid systems.

Similar to the above embodiment, as best shown in FIGS. 16 and 16*a*, a lock out 574 may be provided to prevent the first actuator 570 from being manipulated by the user to provide flow through the relatively high pressure first hose section 506 and the first nozzle 610. The lock out 574 may include a leg 575 that rotates about the first actuator 570 about a pivot pin (or similar structure) 576. In the position shown in FIG. 16, the lock out 574 is not engaged. If the leg 575 of the lock out 574 is rotated in the direction D, the end of the leg 575 engages tab 577 on the handle 530, and the first actuator 570 is physically prevented from being operated by the user, preventing flow through the first hose section 506. The lock out 574 may be formed from other structures known in the art, such as a slidable latch, to prevent the first actuator 570 or the first valve from inadvertently operating.

Each of the first and second nozzles 610, 620 and the first and second wands 612, 622 are formed in substantially the same manner as the similar first and second nozzles 410, 412 and first and second wands 412, 422, discussed above. For example, the longitudinal axis 610*a* through the first nozzle 610 may be provided at an acute angle with respect to the longitudinal axis 620*a* of the second nozzle 620, which allows the spray flow from each of the first and second nozzles 610, 620 to substantially not interact prior to impacting the work surface, which avoids the problems described above.

Figure 17:
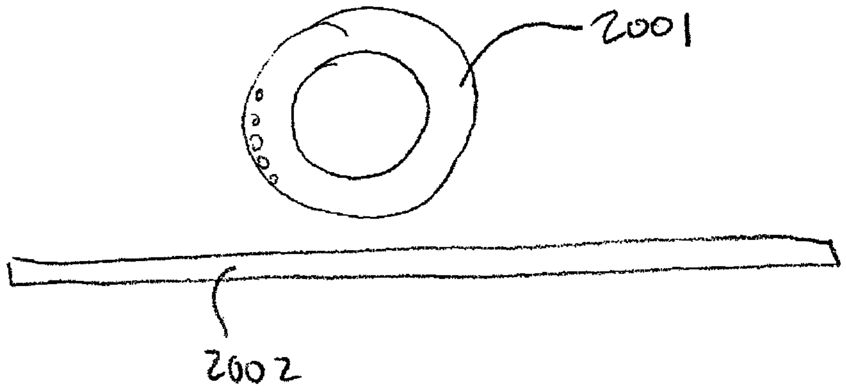
FIG. 17 is a schematic view of a flow pattern from the first and second nozzles of the spray gun of FIG. 16*a*.

In other embodiments and as shown in FIG. 16*a*, the first and second nozzles 610, 620 may be disposed upon the first and second wands 612, 622 such that the fluid leaves the first and second nozzles 610, 620 in a generally parallel manner. In other embodiments, the first and second wands 612, 622 may be configured to allow flow to exit directly from apertures formed on the ends of the wands. The first and second nozzles 610, 620 are received in these apertures. As shown schematically in FIG. 17, the first nozzle 610 may be a pencil jet or turbo nozzle, which provides a relatively cylindrical, and closely bunched flow pattern 2001, which is useful for deep cleaning a surface with concentrated, relatively high pressure flow. The second nozzle 620 may be a fan nozzle, which provides a planar spray 2002 of lower pressure fluid, which can be used to flush dirt and debris removed from the surface by the spray from the first nozzle 610. The flows from this (and other embodiments discussed below) are emitted from the spray gun 520 in a generally parallel fashion, which limits the interaction of the two fluid streams until the streams either hit the surface to be cleaned, or until the streams flow far enough from the spray gun such that the spray flows lose their spray pattern due to decreasing fluid pressure, gravity, or external factors such as wind.

Figure 18:
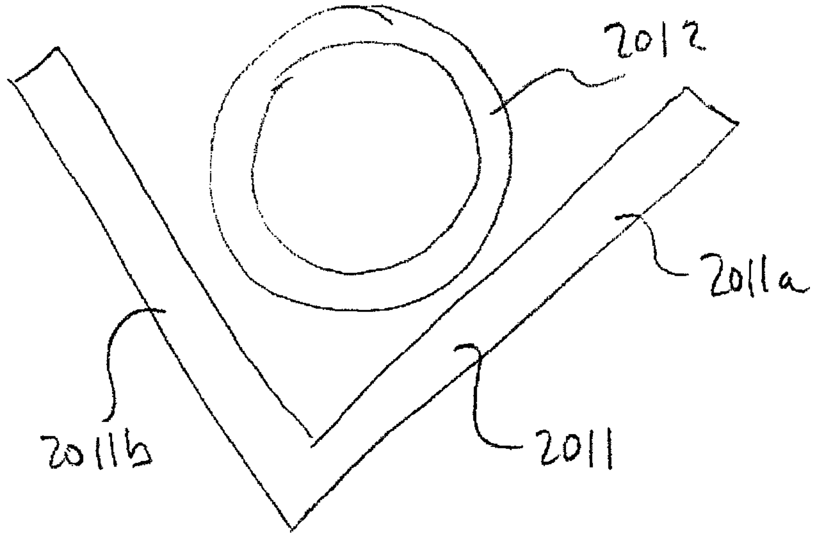
FIG. 18 is schematic view of another flow pattern from the first and second nozzles of the spray gun of FIG. 16*a*.

In other embodiments shown schematically in FIG. 18, the second nozzle 620 may be configured to provide a substantially "v-shaped" flow profile 2011, such that a cylindrical flow profile 2012 from the first nozzle 610 is substantially surrounded by the "v-shaped" profile. The second nozzle 620 may include two elongate slots defined upon the face of the nozzle head, with an end portion of each slot proximate or intersecting the end portion of the opposite slot. Several embodiments of suitable nozzles that produce v-shaped flow patterns are disclosed in commonly owned U.S. Provisional Application No. 61/047,675, filed on Apr. 24, 2008, and U.S. Provisional Application No. 61/047,912, filed on Apr. 25, 2008 the entirety of which are each fully incorporated by reference herein. As can be understood, the planar spray flow patterns 2011*a*, 2011*b* from each slot intersect immediately or a short distance from the nozzle 620, which forms the v-pattern. The v-pattern allows for a fluid flow to surround the majority of the cylindrical spray flow pattern 2012 from the high pressure first nozzle 610. Additionally, the v-pattern spray flow 2011 provides for flushing a relatively large surface area without requiring significant side to side or up and down of the spray gun by the user. Similarly, the v-pattern provides for a relatively large surface area to be flushed (with little motion required) regardless of the orientation of the nozzle with respect to either a horizontal or vertical surface to be cleaned.

The first and second hose sections 506, 509 may be formed from a single length of material that forms two parallel flow paths. In other embodiments, the first and second hose sections 506, 509 may be formed from two separate hoses that may or may not be physically connected together with mechanical connectors. In still other embodiments, the first and second hose sections 506, 509, may be formed from a single length of hose material that form two concentric flow paths. For example, the hose 502 may form an inner flow path for the relatively high pressure flow from the pump 512 and a second, outer but concentric flow path for the low pressure flow bypassing the pump.

Figure 19:
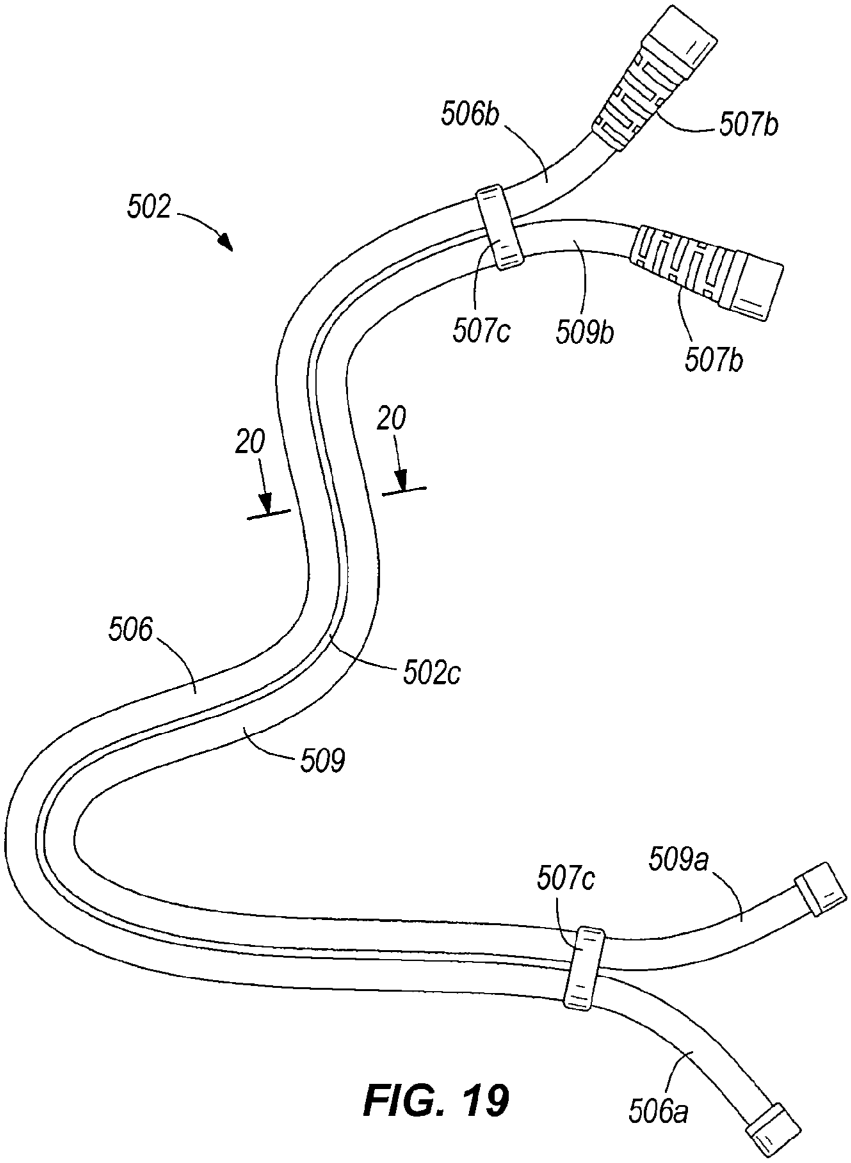
FIG. 19 is a perspective view of a hose usable with the pressure washer of FIG. 15.
Figure 20:
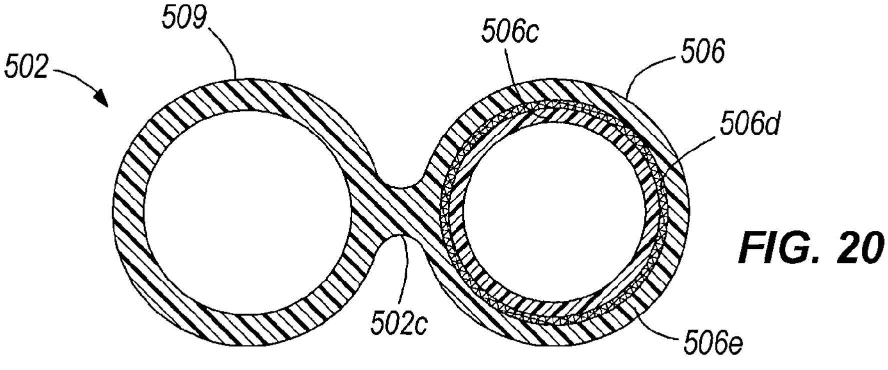
FIG. 20 is a cross-sectional view of about section 20-20 of FIG. 19.

The hose 502 with first and second sections 506, 509 may be monolithically formed as is further described below and shown in FIGS. 19-20. The first and second hose sections 506, 509 may be manufactured as a co-extruded assembly such that a central portion 502*c* of the hose 502 mechanically and integrally connects the first and second hose sections 506, 509. Specifically, the first hose section 506 may be formed from multiple layers to provide sufficient strength for high pressure flow from the pump discharge to flow therethrough, as well as sufficient flexibility for convenient and ergonomic use of the spray gun 520 remotely from the pressure washer main unit in multiple orientations.

The first hose section 506 may be formed with at least an inner layer 506*c*, a woven central layer 506*d*, and a smooth outer layer 506*e* that may be monolithically formed with the second hose section 509. The inner layer 506*c* of the first hose section 506 may be extruded or molded from a light and flexible, but strong material, such as PVC, polyurethane, or santoprene, which provides leak tight internal layer. The inner layer 506*c* must be sufficiently resilient and flexible to maintain a flow conduit therethrough regardless of the orientation of the first hose section 506. After the inner layer 506*c* is formed, a woven central layer 506*d* is disposed upon the internal layer 506*b*. The central layer 506*d* is formed with a plurality of fibers with a high tensile strength, such as polyester or steel, that are wrapped, woven, or braided around the circumference and along the length of the inner layer 506*c*. The braided or webbed central layer 506*d* significantly increases the hoop strength of the first hose section 506 such that the first hose section 506 is configured to allow the relatively high pressure fluid from the pump to flow therethrough. While the central braided layer 506*c* provides a relatively strong tube, the central layer 506*d* does not significantly restrict the flexibility of the tube to prevent the resultant hose from being disposed in a curved manner or serpentine manner as is often necessary or preferred when the hose 502 fluidly connects the first and second outputs of the pressure washer 500 and the spray gun 520.

After the inner and central layers 506*c*, 506*d* are formed, the outer layer 506*e* may be disposed upon the first hose section 506 through an extrusion process, or using other suitable manufacturing processes. As discussed above, the outer layer 506*e* is disposed upon the first hose section 506 in a co-extrusion process when forming the second hose section 509, as shown schematically in FIG. 21.

Figure 21:
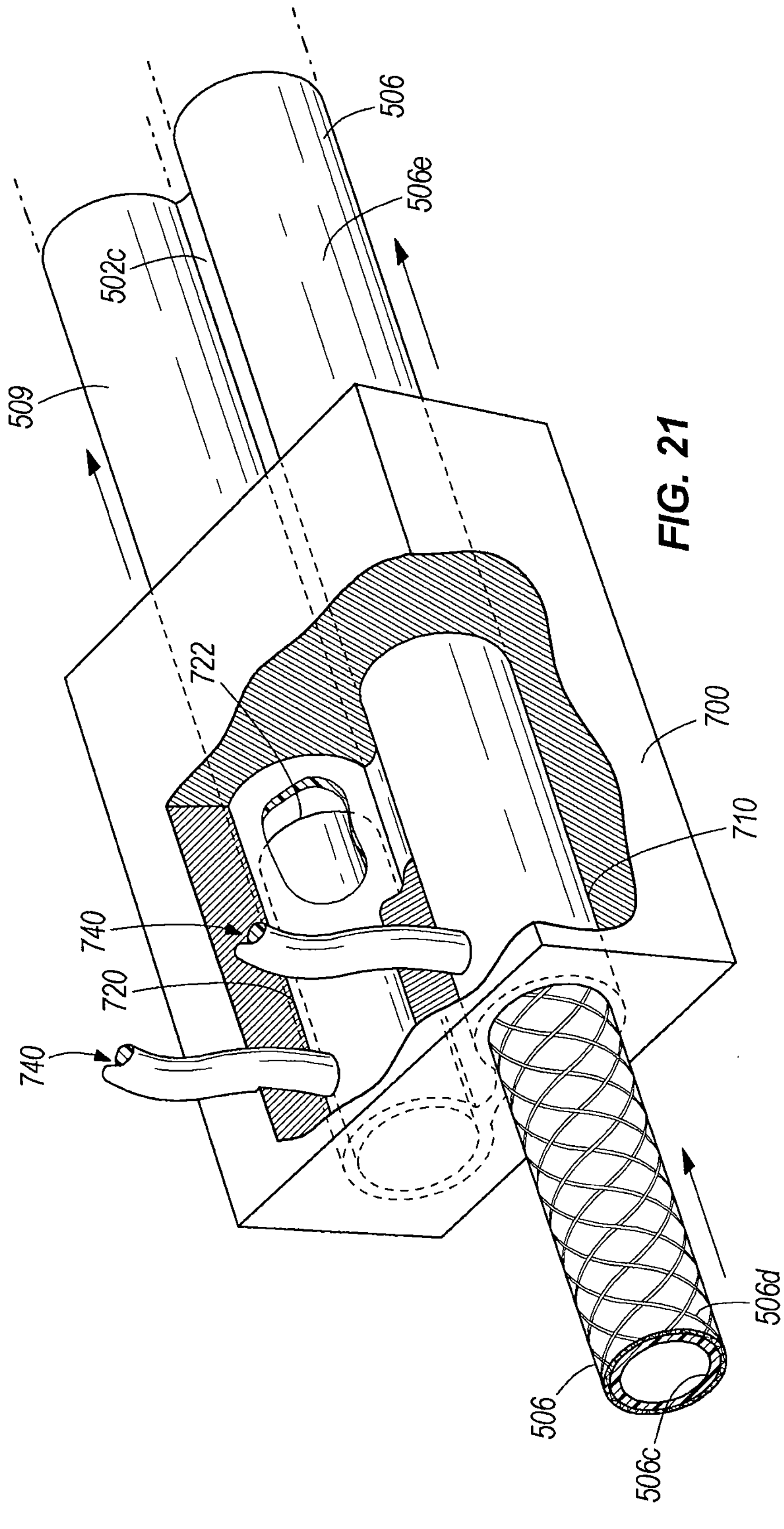
FIG. 21 is a schematic view of an extrusion die used to form the hose of FIG. 19.

After the central layer 506*d* is applied to the inner layer 506*c*, the dual layer subassembly is fed into a hollow extrusion die 700, as shown in FIG. 21. The combined inner and central layers 506*b*, 506*c* receive flowing extrusion material 740 therearound, which fixes to the exposed portions of the inner layer 506*c* and the central layer 506*d*. The thickness of the outer layer 506*e* is defined by the diameter of the first chamber 710 of the extrusion die 700 and the outer diameter of the braided central layer 506*d*. Similarly, the finish of the outer surface of the outer layer 506*e* is defined by the type of material fed into the extrusion die 700, the temperature and pressure within the die, and the amount of cooling provided to the extruded first hose section 506 leaving the extrusion die 700.

The second hose section 509 is formed as a co-extruded member simultaneously and in parallel to the first hose section 506. The extrusion die 700 includes a second cavity 720 disposed beside and proximate to the first cavity 710 that receives the inner braided layer 506*c*. The second cavity includes a mandrel 722 disposed concentrically therein. The mandrel 722 is configured to allow the second hose section 509 to define a hollow conduit coaxially within the second hose section 509. As the first hose section 506 is formed within the first chamber 710 of the extrusion die 700 by dispersing flowing material around the braided inner and central layers 506*c*, 506*d*, the flowing material simultaneously covers the mandrel 722 to form the second hose section 509. At this stage, the first and second chambers 710, 720 are open to each other, and the walls provide an open section 730 that receives flowing material to form a central portion 502*c*. The flowing material hardens due to cooling, chemical processes, or the like, as the combined tubes 506, 509 are urged through the length of the die. The now monolithic first and second tubes 506, 509 may be cooled when leaving the extrusion die X, which further hardens the first and second tubes 506, 509, and the central portion 502*c*, and maintains the integrity of the hollow conduit formed therein.

The hose 502 may be prepared by splitting the central portion 502*c* on the ends of the tube 502, which allows appropriate fluid connectors (i.e. quick connect couplers, threaded connectors, and the like) to be placed thereon depending on the rated fluid pressure of each hose portion. In some embodiments, strain relief members 507*b* may be provided proximate the ends of the first and second hoses 506, 509. As known in the art, strain relief members are configured to allow the first and second hoses 506, 509 to move without cracking and/or breaking away from the connectors (i.e. on the spray gun 520 or pressure washer outlets). Strain relief members are typically a series of ridges at the point where the hose meets the connector that flexibility in the hose without putting stress on that relatively vulnerable point in the hose. Further mechanical connectors 507*c* may be disposed proximate each opposite end of the central portion 502*c* of the hose 502, to prevent the central portion 502*c* from splitting during use, when the two hose portions may be pulled or urged in different directions.

The pressure washer 500 may be operated by a motor controller in embodiments where the pressure washer includes an electric motor to operate the pump (not shown), which operates similarly to the motor controllers 120, 450 discussed above. In embodiments where the pump 512 is powered by an engine, the pressure washer 500 may be include a fuel cutout valve, or throttle valve, which limits or eliminates fuel from flowing to the engine (and accordingly, the pump 512) from operating when a high back pressure between the pump 512 and the first valve (on the relatively high pressure hose 506) is detected. Alternatively, an unloader valve (not shown) may be provided on the outlet of the pump. The unloader valve prevents flow from the pump through the first hose 509 when the pump outlet pressure rises above a set pressure, which causes the unloader valve reposition and directs the fluid leaving the pump to flow in a bypass recirculation flow path to the pump inlet. A high pressure situation at the pump outlet is an indication that the first, or high pressure, valve is shut. The bypass flow path may additionally include a thermal relief valve (not shown) to vent the fluid within the bypass line to atmosphere if the fluid temperature exceeds a specified temperature, such as 140 degrees Fahrenheit. Increasing fluid temperatures within the bypass line is an indication that the same fluid continuously flows through the pump.

It is apparent that apparatus incorporating modifications and variations to the pressure washer of the present invention described above will be obvious to one skilled in the art. Inasmuch as the foregoing disclosure is intended to describe the present invention the above description should not be construed to limit the present invention but should be construed to include any obvious variations and should be limited only by the spirit and scope of the following claims. It is therefore intended that the foregoing detailed description be regarded as illustrative rather than limiting, and that it should be understood that it is the following claims, including all equivalents, that are intended to define the spirit and scope of this invention.

What is claimed:

1. A hose for use with a pressure washer having a spray gun, the hose comprising:

a first hose section for directing a flow of relatively high pressure fluid to the spray gun, the first hose section including a first layer formed from a first material and a second layer formed from a second material, the second layer substantially surrounding the first layer; and a second hose section for directing a flow of relatively low pressure fluid to the spray gun parallel to the flow of relatively high pressure fluid, wherein the second hose section is formed from the second material monolithically with the second layer of the first hose section to form an innermost layer of the second hose section that is in direct contact with the flow of relatively low pressure fluid.

2. The hose of claim 1, wherein the second layer of the first hose section and the second hose section are formed by extrusion such that the first hose section and the second hose section are a co-extruded assembly.

3. The hose of claim 1, wherein the second hose section is formed by a single layer monolithically formed with the second layer of the first hose section.

4. The hose of claim 1, wherein the first hose section further includes a third layer, and wherein the third layer substantially surrounds the first layer between first layer and the second layer.

5. The hose of claim 4, wherein the third layer is composed of woven fibers and the first layer is composed of a polymeric material.

6. The hose of claim 1, further comprising a central portion integrally connecting as a single component the second layer of the first hose section and the second hose section.

7. The hose of claim 1, wherein the first hose section extends generally parallel to the second hose section such that the first hose section and the second hose section form two parallel flow paths.

8. The hose of claim 1, wherein the first hose section is fluidly isolated from the second hose section such that the relatively high pressure fluid and the relatively low pressure fluid are discrete flows of fluid.

9. A pressure washer for pressurizing and spraying fluid from a source of fluid, the pressure washer comprising:

a base including, a fluid inlet configured to connect to the source of fluid, a pump including an outlet, and a bypass line in fluid communication with the fluid inlet and bypassing the pump;

a spray gun; and a hose to provide fluid communication from the base to the spray gun, the hose including a first hose section in fluid communication with the outlet of the pump and the spray gun to direct a flow of relatively high pressure fluid from the pump to the spray gun, the first hose section including a first layer formed from a first material and a second layer formed from a second material, the second layer substantially surrounding the first layer, and a second hose section in fluid communication with the bypass line to direct a flow of relatively low pressure fluid from the source of fluid to the spray gun, wherein the second hose section is formed from the second material monolithically with the second layer of the first hose section such that the second hose section is formed by a single layer of the second material that is in direct contact with the flow of relatively low pressure fluid.

10. The pressure washer of claim 9, wherein the second layer of the first hose section and the second hose section are formed by extrusion such that the first hose section and the second hose section are a co-extruded assembly.

11. The pressure washer of claim 9, wherein the first hose section further includes a third layer, and wherein the third layer of the first hose section substantially surrounds the first layer.

12. The pressure washer of claim 11, wherein the third layer of the first hose section is composed of woven fibers and the first layer of the first hose section is composed of a polymeric material.

13. The pressure washer of claim 9, further comprising a central portion integrally connecting as a single component the second layer of the first hose section and the second hose section.

14. The pressure washer of claim 9, wherein the first hose section extends generally parallel to the second hose section such that the first hose section and the second hose section form two parallel flow paths.

15. The pressure washer of claim 9, wherein the first hose section is fluidly isolated from the second hose section such that the relatively high pressure fluid and the relatively low pressure fluid are discrete flows of fluid.

16. A method of manufacturing a hose for use with a pressure washer having a spray gun, the method comprising:

providing a first layer of a first material to provide a first flow path for directing a flow of relatively high pressure fluid to the spray gun; and monolithically forming a second layer of a second material that substantially surrounds the first layer to define a first hose section and also an innermost layer of a second hose section that defines a second flow path parallel to the first flow path for directing a flow of relatively low pressure fluid to the spray gun, wherein the innermost layer of the second hose section is formed of the second material and is in direct contact with the flow of relatively low pressure fluid.

17. The method of claim 16, wherein monolithically forming the second layer of the first hose section and the second hose section includes extruding the second layer of the first hose section over the first layer of the first hose section while extruding the second hose section such that the first hose section and the second hose section are a co-extruded assembly.

18. The method of claim 17, further comprising feeding the first layer into an extrusion die having a first cavity and a second cavity, wherein extruding the second layer of the first hose section over the first layer includes supplying extrusion material to the first cavity to substantially surround the first layer with the second layer, and wherein extruding the second hose section includes supplying extrusion material to the second cavity to form the second hose section.

19. The method of claim 16, wherein providing the first layer further includes providing the first layer with a third layer that surrounds the first layer.

20. The method of claim 19, wherein providing the third layer includes providing the third layer composed of a woven material, and wherein providing the first layer includes providing the first layer composed of a polymeric material.

21. The method of claim 16, wherein forming the second layer of the first hose section and the second hose section includes forming the second hose section simultaneously and in parallel to the second layer of the first hose section.

22. A hose for use with a pressure washer having a spray gun, the hose comprising:

a first hose section for directing a flow of relatively high pressure fluid to the spray gun, the first hose section including a first layer formed from a first material and a second layer formed from a second material, the second layer substantially surrounding the first layer; and a second hose section including a generally cylindrical layer formed from the second material and an innermost surface for directing a flow of relatively low pressure fluid to the spray gun parallel to the flow of relatively high pressure fluid, the innermost surface being in direct contact with the flow of relatively low pressure fluid, wherein the second layer of the first hose section and the layer of the second hose section are monolithic, and wherein the first layer of the first hose section increases a hoop strength of the first hose section relative to the second hose section to withstand internal pressure from the flow of relatively high pressure fluid.

23. The hose of claim 22, wherein the innermost surface of the second hose section is formed by the layer of the second hose section such that the second hose section is formed as a single layer.

24. The hose of claim 22, wherein the first layer of the first hose section is composed of woven fibers.

25. The hose of claim 24, wherein the first hose section further includes a third layer positioned within the first layer, and wherein the third layer is composed of a polymeric material.

* * * * *